(12) United States Patent
Nitta et al.

(10) Patent No.: US 9,369,831 B2
(45) Date of Patent: Jun. 14, 2016

(54) BASE STATION APPARATUS, WIRELESS COMMUNICATION SYSTEM, AND WIRELESS COMMUNICATION METHOD

(71) Applicant: FUJITSU LIMITED, Kawasaki (JP)

(72) Inventors: Daisuke Nitta, Kawasaki (JP); Yuki Shinada, Saitama (JP); Hiromitsu Kawai, Yokohama (JP); Masamitsu Komi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 13/666,362

(22) Filed: Nov. 1, 2012

(65) Prior Publication Data
US 2013/0165069 A1  Jun. 27, 2013

(30) Foreign Application Priority Data
Dec. 26, 2011 (JP) .................. 2011-282928

(51) Int. Cl.
*H04W 4/02* (2009.01)
*H04W 4/22* (2009.01)
*H04W 12/06* (2009.01)
*H04W 60/04* (2009.01)
*H04W 76/00* (2009.01)

(52) U.S. Cl.
CPC . *H04W 4/02* (2013.01); *H04W 4/22* (2013.01); *H04W 12/06* (2013.01); *H04W 60/04* (2013.01); *H04W 76/002* (2013.01); *H04W 76/007* (2013.01)

(58) Field of Classification Search
CPC ....... H04W 60/04; H04W 64/00; H04W 4/02; H04W 24/10; H04W 4/22

USPC .............. 455/404.1–404.2, 456.1, 456.5, 458
See application file for complete search history.

(56) References Cited

U.S. PATENT DOCUMENTS

| 8,744,411 B2 * | 6/2014 | Harris et al. ............... 455/412.1 |
| 8,769,023 B2 * | 7/2014 | Lau ............................. 709/206 |

FOREIGN PATENT DOCUMENTS

| JP | 2001-320494 | | 11/2001 |
| JP | 2006-254080 | | 9/2006 |
| JP | 2007-36675 | | 2/2007 |
| JP | 2007-036675 A | * | 2/2007 |
| JP | 2007-181027 | | 7/2007 |
| JP | 2007-228480 | | 9/2007 |
| JP | 2009-289194 | | 12/2009 |
| JP | 2009289194 A | * | 12/2009 |

OTHER PUBLICATIONS

Japanese Office Action issued Apr. 28, 2015 in corresponding Japanese Patent Application No. 2011-282928.

* cited by examiner

*Primary Examiner* — Nam Huynh
(74) *Attorney, Agent, or Firm* — Staas & Halsey LLP

(57) ABSTRACT

A base station apparatus including: a transmitter, and a processor to control the transmitter to transmit true area information when a given event is not detected, and to transmit false area information when the given event is detected. A wireless communication system including: a mobile station apparatus; and a base station apparatus to transmit true area information to the mobile station when a given event is not detected, and to transmit false area information to the mobile station when the given event is detected.

15 Claims, 26 Drawing Sheets

FIG. 4

| MOBILE STATION IDENTIFIER | TRANSMISSION TIME | GPS INFORMATION | | | | | NUMBER OF TRANSMISSIONS |
|---|---|---|---|---|---|---|---|
| | | LATITUDE SIGN | LATITUDE | LONGITUDE | ALTITUDE DIRECTION | ALTITUDE | |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | 4 |
| ...... | ...... | ...... | ...... | ...... | ...... | ...... | ...... |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 |

FIG. 7

| MOBILE STATION IDENTIFIER | TRANSMISSION TIME | GPS INFORMATION | | | | | NUMBER OF TRANSMISSIONS | | BASE STATION INFORMATION | | SEARCH PRIORITY |
| --- | --- | --- | --- | --- | --- | --- | --- | --- | --- | --- | --- |
| | | LATITUDE SIGN | LATITUDE | LONGITUDE | ALTITUDE DIRECTION | ALTITUDE | CN SIMULATION | CN | LOCATION INFORMATION ACQUIRING BASE STATION | TRAVEL HISTORY | |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | 4 | 1 | 001 | YES (002) | 0 |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 | 0 | 001 | NO | 2 |

FIG. 10

| HEADER INFORMATION | SOURCE BASE STATION IDENTIFIER | | 001 | | | |
|---|---|---|---|---|---|---|
| | REPORT SIGNAL IDENTIFIER | | 0123 | | | |
| | DATE AND TIME OF TRANSMISSION | | NOVEMBER 22, 2011 11:22:33 | | | |
| MOBILE STATION IDENTIFIER | TRANSMISSION TIME | GPS INFORMATION | | | | NUMBER OF TRANSMISSIONS |
| | | LATITUDE SIGN | LATITUDE | LONGITUDE | ALTITUDE DIRECTION | ALTITUDE |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | 4 |
| ...... | ...... | ...... | ...... | ...... | ...... | ...... | ...... |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 |

FIG. 12

| INFORMATION ELEMENT | EXAMPLE |
|---|---|
| TYPE | EARTHQUAKE |
| PREDICTED ARRIVAL TIME | 11:22:33 |
| TARGET AREA | ○○ PREFECTURE, ×× CITY |
| MAGNITUDE | M8.0 |
| MAXIMUM EARTHQUAKE INTENSITY | 5 |

FIG. 13

| CLASSIFICATION | INFORMATION ELEMENT | EXAMPLE |
|---|---|---|
| BASIC INFORMATION | BASE STATION IDENTIFIER | 001 |
| | INSTALLATION AREA | ○○ PREFECTURE, ×× CITY |
| CONDITIONS TO START LOCATION MEASUREMENT | MAGNITUDE | 6.0 OR LARGER |
| | MAXIMUM EARTHQUAKE INTENSITY | 4 OR MORE |
| | POWER SUPPLY STATE | INTERNAL POWER SUPPLY (BATTERY) |
| | STATE OF NEARBY BASE STATIONS | NO TRANSMISSION SIGNAL |
| | STATE OF NIF | DISCONNECTED |

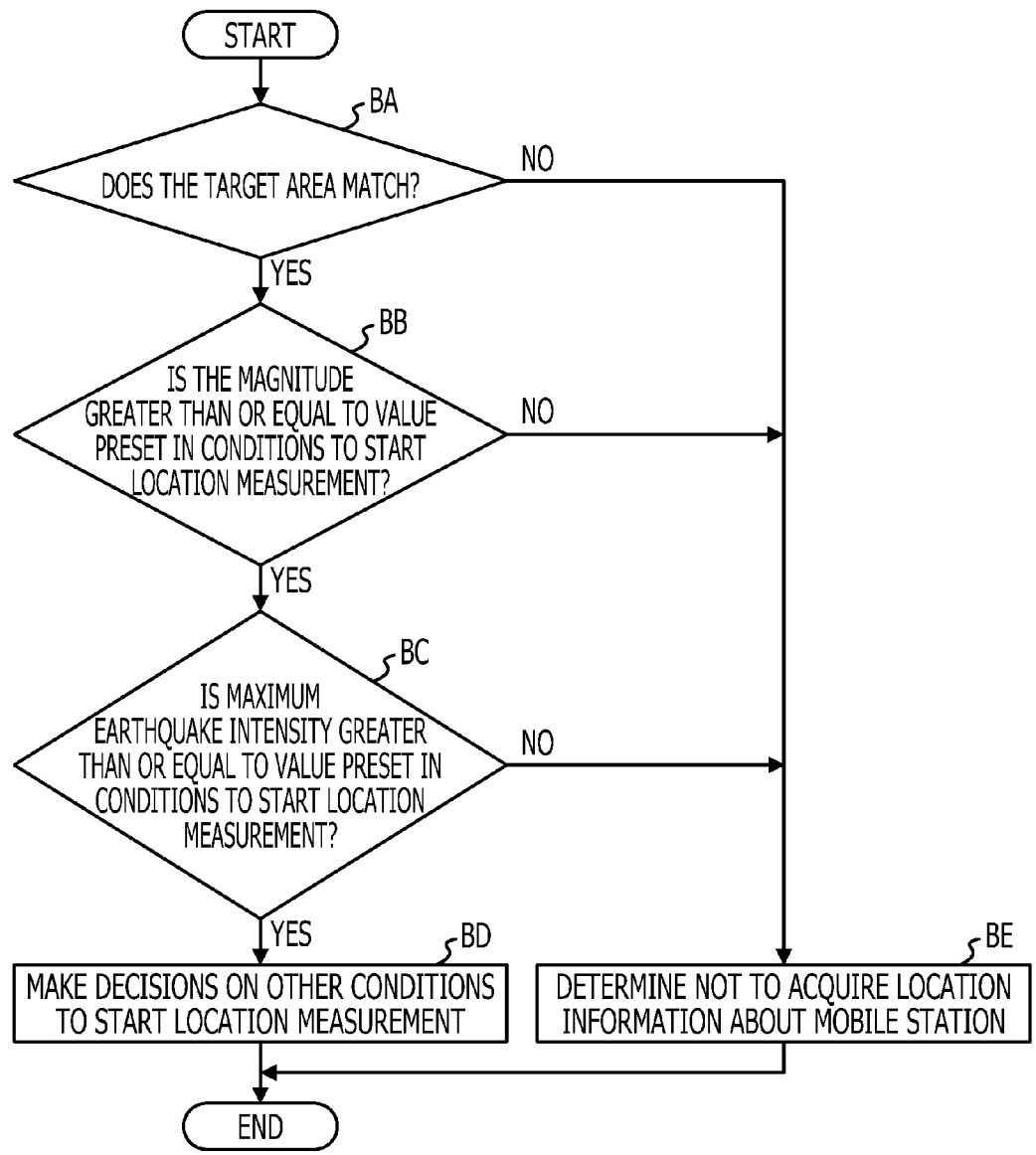

FIG. 17

| INFORMATION ELEMENT | VALUE |
|---|---|
| MC SIGNAL TYPE | GPS-BASED LOCATION MEASUREMENT |
| TRANSMISSION TIMING | AFTER ONE SECOND HAS ELAPSED |
| TRANSMISSION POWER | MAXIMUM |

FIG. 18

| CLASSIFICATION | INFORMATION ELEMENT | EXAMPLE |
|---|---|---|
| MOBILE STATION INFORMATION | MOBILE STATION IDENTIFIER | AAAA |
| TIME INFORMATION | TRANSMISSION TIME | 11:22:33 |
| GPS INFORMATION | LATITUDE SIGN | NORTH |
| | LATITUDE | 35 DEGREES, 39 MINUTES, 30.992 SECONDS |
| | LONGITUDE | 139 DEGREES, 44 MINUTES, 43.609 SECONDS |
| | ALTITUDE DIRECTION | HEIGHT |
| | ALTITUDE | 10 (m) |

FIG. 19

| MOBILE STATION IDENTIFIER | TRANSMISSION TIME | GPS INFORMATION | | | | | NUMBER OF TRANSMISSIONS |
| --- | --- | --- | --- | --- | --- | --- | --- |
| | | LATITUDE SIGN | LATITUDE | LONGITUDE | ALTITUDE DIRECTION | ALTITUDE | |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | YET TO ACQUIRE |
| ...... | | ...... | | | ...... | | |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | YET TO ACQUIRE |

FIG. 20

| MOBILE STATION IDENTIFIER | TRANSMISSION TIME | GPS INFORMATION | | | | | NUMBER OF TRANSMISSIONS |
|---|---|---|---|---|---|---|---|
| | | LATITUDE SIGN | LATITUDE | LONGITUDE | ALTITUDE DIRECTION | ALTITUDE | |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | 4 |
| ... | ... | ... | ... | ... | ... | ... | ... |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 |

FIG. 22

<table>
<tr><td rowspan="2">HEADER INFORMATION</td><td colspan="4">SOURCE BASE STATION IDENTIFIER</td><td colspan="3">001</td></tr>
<tr><td colspan="4">REPORT SIGNAL IDENTIFIER</td><td colspan="3">0123</td></tr>
<tr><td></td><td colspan="4">DATE AND TIME OF TRANSMISSION</td><td colspan="3">NOVEMBER 22, 2011 11:22:33</td></tr>
<tr><td></td><td colspan="4">MOBILE STATION IDENTIFIER</td><td colspan="3">AAAA</td></tr>
<tr><td></td><td colspan="4">CONNECTED-TO BASE STATION IDENTIFIER</td><td colspan="3">0002</td></tr>
<tr><td rowspan="3">MOBILE STATION IDENTIFIER</td><td rowspan="3">TRANSMISSION TIME</td><td colspan="6">GPS INFORMATION</td><td rowspan="3">NUMBER OF TRANSMISSIONS</td></tr>
<tr><td colspan="2">LATITUDE</td><td>LONGITUDE</td><td>ALTITUDE DIRECTION</td><td>ALTITUDE</td></tr>
<tr><td>LATITUDE SIGN</td><td></td><td></td><td></td><td></td></tr>
<tr><td>AAAA</td><td>11:22:33</td><td>NORTH</td><td>35 DEGREES, 39 MINUTES, 30.992 SECONDS</td><td>139 DEGREES, 44 MINUTES, 43.602 SECONDS</td><td>HEIGHT</td><td>10 (m)</td><td>4</td></tr>
<tr><td>ZZZZ</td><td>11:22:35</td><td>NORTH</td><td>35 DEGREES, 39 MINUTES, 30.999 SECONDS</td><td>139 DEGREES, 44 MINUTES, 43.609 SECONDS</td><td>HEIGHT</td><td>10 (m)</td><td>0</td></tr>
</table>

FIG. 24

| MOBILE STATION IDENTIFIER | TRANSMISSION TIME | GPS INFORMATION ||||| NUMBER OF TRANSMISSIONS || BASE STATION INFORMATION || SEARCH PRIORITY |
| --- | --- | --- | --- | --- | --- | --- | --- | --- | --- | --- | --- |
| | | LATITUDE SIGN | LATITUDE | LONGITUDE | ALTITUDE DIRECTION | ALTITUDE | CN SIMULATED | CN | LOCATION INFORMATION ACQUIRING BASE STATION | TRAVEL HISTORY | |
| AAAA | 11:22:33 | NORTH | 35 DEGREES, 39 MINUTES, 30.992 SECONDS | 139 DEGREES, 44 MINUTES, 43.602 SECONDS | HEIGHT | 10 (m) | 4 | YET TO ACQUIRE | 001 | YES (002) | YET TO DETERMINE |
| ⋯ | ⋯ | ⋯ | ⋯ | ⋯ | ⋯ | ⋯ | ⋯ | ⋯ | ⋯ | ⋯ | ⋯ |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 | YET TO ACQUIRE | 001 | NO | YET TO DETERMINE |

FIG. 25

| MOBILE STATION IDENTIFIER | TRANSMISSION TIME | GPS INFORMATION | | | | | NUMBER OF TRANSMISSIONS | | BASE STATION INFORMATION | | SEARCH PRIORITY |
|---|---|---|---|---|---|---|---|---|---|---|---|
| | | LATITUDE SIGN | LATITUDE | LONGITUDE | ALTITUDE DIRECTION | ALTITUDE | CN SIMULATED | CN | LOCATION INFORMATION ACQUIRING BASE STATION | TRAVEL HISTORY | |
| AAAA | 11:22:33 | NORTH | 35 DEGREES, 39 MINUTES, 30.92 SECONDS | 139 DEGREES, 44 MINUTES, 43.602 SECONDS | HEIGHT | 10 (m) | 4 | 1 | 001 | YES (002) | YET TO DETERMINE |
| ..... | | | | | | | | | | | |
| ZZZZ | 11:22:35 | NORTH | 35 DEGREES, 39 MINUTES, 30.999 SECONDS | 139 DEGREES, 44 MINUTES, 43.609 SECONDS | HEIGHT | 10 (m) | 0 | 0 | 001 | NO | YET TO DETERMINE |

BASE STATION APPARATUS, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2011-282928, filed on Dec. 26, 2011, the entire contents of which are incorporated herein by reference.

FIELD

The embodiments discussed herein are related to the acquisition of location information for a mobile station apparatus in wireless communication system.

BACKGROUND

A known base station apparatus has a measuring unit that detects the occurrence of disasters such as earthquakes. When a disaster occurs, the base station apparatus broadcasts the occurrence of the disaster to terminals. If the network has a failure, the base station apparatus broadcasts information, stored in its storage unit, that represents a map of an area around the base station to the terminals. The base station apparatus also transmits the terminals a rescue requesting program that executes processing to send given rescue requesting information, which includes location information for the terminal, from the terminal to a rescue requesting terminal monitoring server.

To suppress radio signal interference with adjacent base station apparatuses, a known remote monitoring system shifts times at which adjacent base station apparatuses send radio signals. There is also a known information providing apparatus that, when a natural disaster such as an earthquake occurs, transmits current location information for the current locations of mobile terminal apparatuses in affected areas to emergency contact addresses of the mobile terminal apparatuses.

Japanese Laid-open Patent Publication Nos. 2007-181027, 2001-320494, and 2009-289194 are examples of related art.

SUMMARY

According to an aspect of the invention, a base station apparatus includes a transmitter, and a processor to control the transmitter to transmit true area information when a given event is not detected, and to transmit false area information when the given event is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of location data to be stored in a location data storage unit in the base station apparatus.

FIG. 7 is an example of compiled data to be stored in a location data storage unit in the core network node apparatus.

FIG. 10 illustrates an example of location data to be stored in a location data storage unit in the mobile station apparatus.

FIG. 12 illustrates an example of the format of a broadcast signal.

FIG. 13 illustrates an example of the format of base station information.

FIG. 14 illustrates processing executed by a state determining unit to make a determination about the broadcast signal.

FIG. 17 illustrates an example of the signal format of a command to send a location measurement request.

FIG. 18 illustrates an example of an MR signal transmitted by a mobile station.

FIG. 19 illustrates an example of the contents of location data directly after an MR signal has been received.

FIG. 20 illustrates an example of location data items, each of which includes the number of transmissions.

FIG. 22 illustrates an example of the signal format of location data transmitted from a mobile station to a core network node.

FIG. 24 illustrates an example of compiled data directly after compilation.

FIG. 25 illustrates an example of compiled data after the number of transmissions has been recorded.

DESCRIPTION OF EMBODIMENTS

By communicating with a core network via a base station, a mobile station has transmitted location information to the core network. With the technology described above, however, it has been desirable to embed special techniques to, for example, incorporate programs into the mobile station.

An object of the apparatuses and method in the present disclosure is to have a base station collect information about mobile stations without adding new functions to the mobile stations.

1. Example of a System Structure

Figure 1:
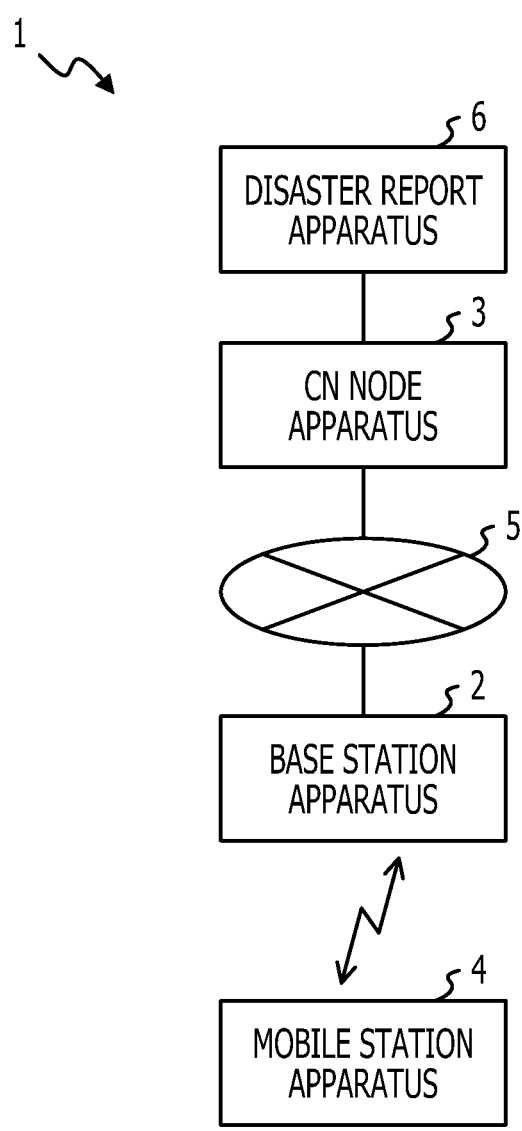
FIG. 1 is an example of the overall structure of a communication system.

A preferred embodiment will be described below with reference to the drawings. FIG. 1 is an example of the overall structure of a communication system. The communication system 1 includes a base station apparatus 2, a core network node apparatus 3, a mobile station apparatus 4, and a fixed communication network 5. In the descriptions below and the drawings, the term core network may be abbreviated as CN, the term base station apparatus may be referred to as base station, and the term mobile station apparatus may be referred to as mobile station.

The base station apparatus 2 is a wireless station apparatus that relays signals, between the fixed communication network 5 and the mobile station apparatus 4 of a user who receives mobile communication services, according to a given wireless communication protocol. The wireless communication protocol that the base station apparatus 2 conforms to may be, for example, the Wideband Code Division Multiple Access (W-CDMA) method or the Long Term Evolution (LTE) method. When conforming to the W-CDMA method, the base station apparatus 2 may be a femto base station that is connected to the CN node apparatus 3 through an Iuh interface and controls the Radio Resource Control (RRC) protocol.

The CN node apparatus 3 is a node apparatus on a core network that is connected to a wireless access network that interconnects the base station apparatus 2 and mobile station apparatus 4. The fixed communication network 5 is a wide-area layer-2 network or an optical fiber network that interconnects the CN node apparatus 3 and base station apparatus 2. The mobile station apparatus 4 is a terminal apparatus used by the user to communicate through the Internet such as using the World-Wide-Web and to communicate by transmitting and receiving voice through a wireless communication network.

The CN node apparatus 3 is, for example, a mobility management entity (MME). The MME receives an attach request transmitted from a mobile station. The attach request notifies the core network that the mobile station is ready for communication. Upon receipt of the attach request, the MME performs processing according to the message included in the attach request.

It is assumed here that a location registration request is included in the attach request that the MME receives from the mobile station. The location registration request includes the identifier of the area in which the mobile station was present as well as the identifier of the mobile station. The core network that includes the MME and the like uses the identifiers to authenticate the mobile station and register the location of the mobile station.

The core network uses the universal subscriber identification module (USIM) of the mobile station to perform mutual authentication between the mobile station and the MME according to the authentication and key agreement (AKA) method. The core network also registers the location of the mobile station by using the area identifier included in the location registration request. After processing has been carried out, the MME transmits a reply indicating, among other things, that the MME is ready to accept the mobile station. The reply includes, for example, a global unique temporary identifier (GUTI) assigned to the mobile station. The GUTI is an identifier that is temporarily assigned to the mobile station. The identifier includes a field that uniquely identifies the MME.

Upon completion of the processing described above, the MME becomes ready to manage the location of the mobile station, perform authentication processing, and control handovers.

That is, the mobile station does not start communication until the MME performs the processing described above and notifies the mobile station that the core network may accept the mobile station.

The base station apparatus 2 receives a broadcast signal transmitted from a disaster notice apparatus 6 through the core network and the CN node apparatus 3. A broadcast signal transmitted from the disaster notice apparatus 6 is, for example, a signal that indicates the occurrence of a disaster, such as an earthquake emergency warning or a tsunami emergency warning. The disaster notice apparatus 6 may be, for example, a cell broadcast entity (CBE) apparatus, operated by the Japan Meteorological Agency or other organizations, that distributes earthquake and tsunami emergency warnings in the Earthquake and Tsunami Warning System (ETWS). The broadcast signal distributed from the CBE apparatus is transmitted the CN node apparatus 3 through a cell broadcast service (CBS) apparatus operated by a communication carrier.

2. Example of the Structure of the Base Station Apparatus 2

2.1 Hardware Structure of the Base Station Apparatus 2

Figure 2:
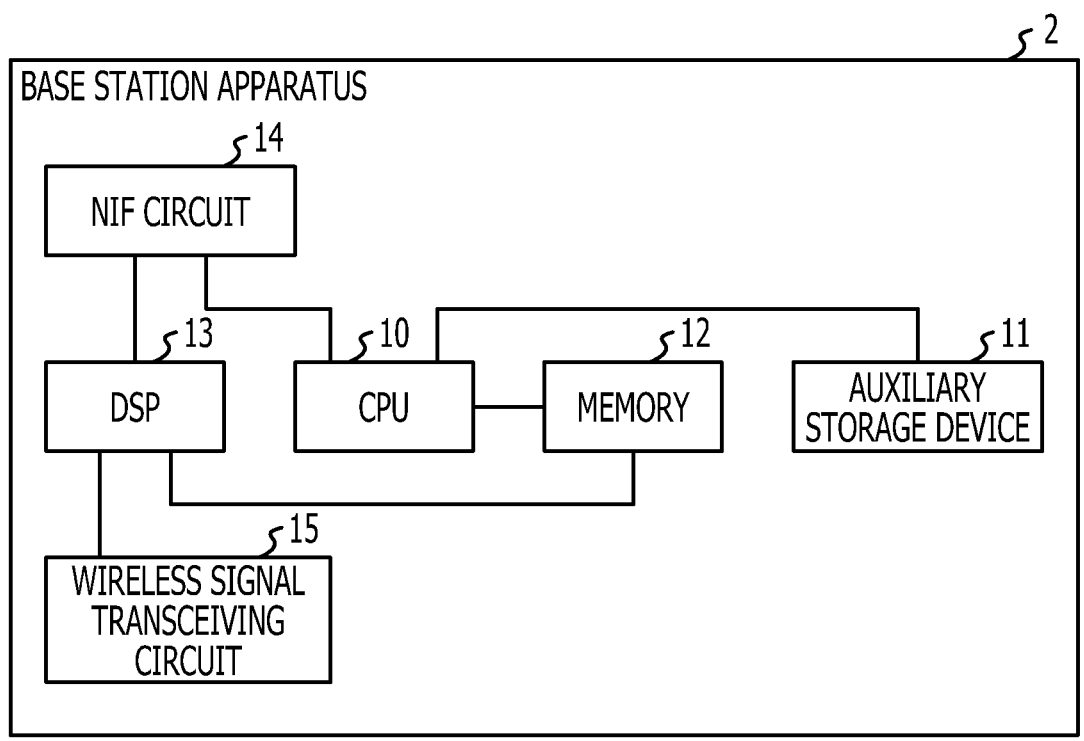
FIG. 2 is an example of the hardware structure of a base station apparatus.

Next, elements of the communication system 1 described above will be described. FIG. 2 is an example of the hardware structure of the base station apparatus 2. The base station apparatus 2 includes a central processing unit (CPU) 10, an auxiliary storage unit 11, a memory 12, a digital signal processing (DSP) 13, a network interface circuit 14, and a wireless signal transceiving circuit 15. In the descriptions below, the term network interface may be abbreviated as NIF. The hardware structure illustrated in FIG. 2 is an example of a hardware structure that implements the base station apparatus 2. A different hardware structure may be used if the different hardware structure may execute processing described below.

The CPU 10 follows a computer program stored in the auxiliary storage unit 11, and controls the base station apparatus 2 and collects location data about the mobile station apparatus 4, as described later. The auxiliary storage unit 11 stores both computer programs executed by the CPU 10 as well as data used during the execution of the computer programs. The auxiliary storage unit 11 may include a nonvolatile storage unit, a read-only memory (ROM), a hard disk or the like. The memory 12 stores a program currently executed by the CPU 10 and data that is temporarily used by the program. The memory 12 may include a random-access memory (RAM).

The DSP 13 controls wireless communication with the mobile station apparatus 4. The memory 12 is also used to temporarily store data used in processing executed by the DSP 13. The NIF circuit 14 processes signals transmitted and received in communication through the fixed communication network 5. The wireless signal transceiving circuit 15 transmits and receives wireless signals in wireless communication with the mobile station apparatus 4.

2.2 Functional Structure of the Base Station Apparatus 2

Figure 3:
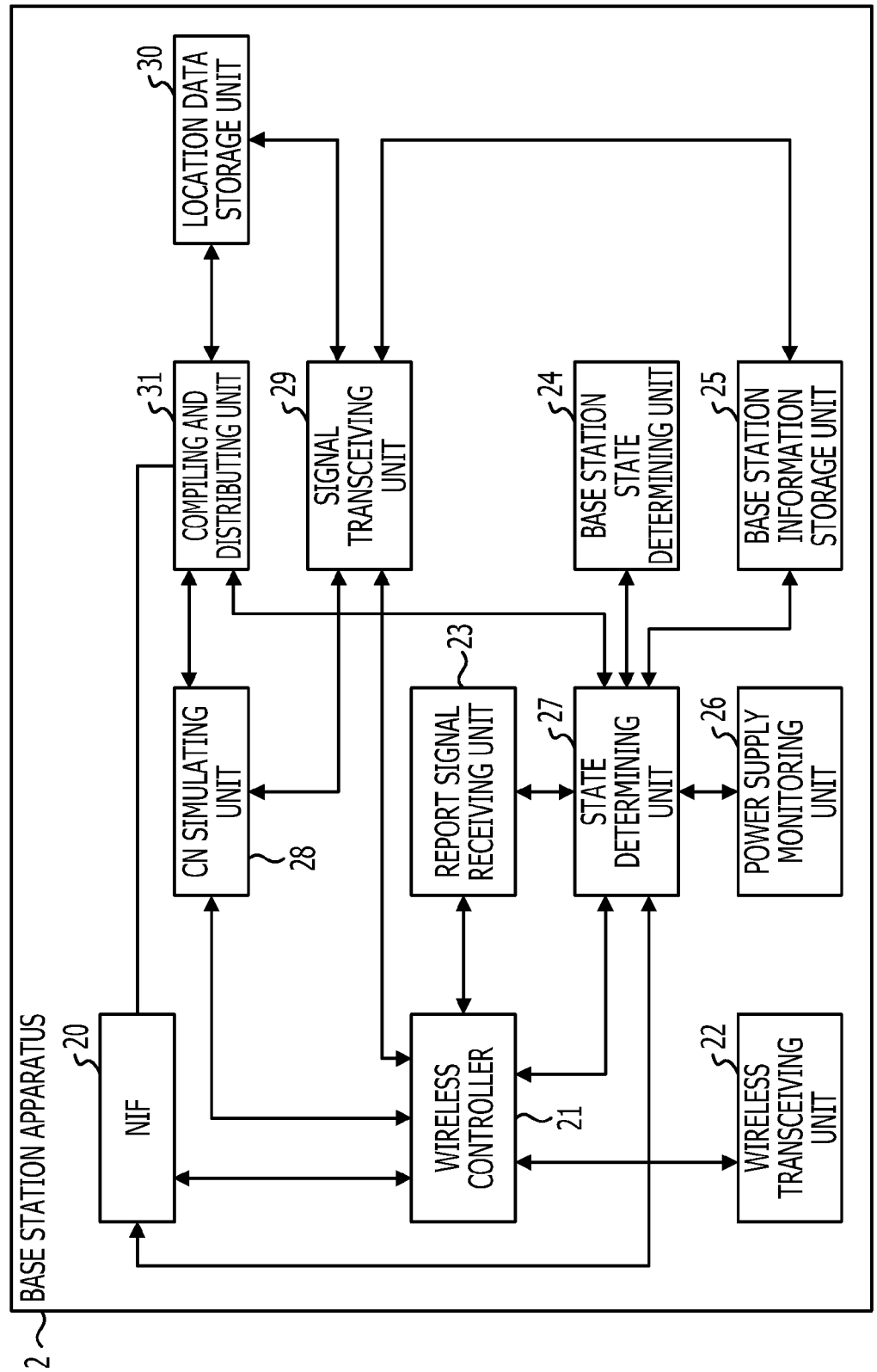
FIG. 3 is an example of a functional block diagram of the base station apparatus.

Next, the functions of the base station apparatus 2 implemented by the hardware structure described above will be described. FIG. 3 is an example of a functional block diagram of the base station apparatus 2. The base station apparatus 2 includes a NIF 20, a wireless controller 21, a wireless transceiving unit 22, a broadcast signal receiving unit 23, a base station state determining unit 24, a base station information storage unit 25, a power supply monitoring unit 26, and a state determining unit 27. The base station apparatus 2 also includes a CN simulating unit 28, a signal transceiving unit 29, a location data storage unit 30, and a compiling and distributing unit 31. FIG. 3 mainly illustrates functions related to the descriptions below; the base station apparatus 2 may include other constituent elements not illustrated in FIG. 3.

The NIF 20 is an interface with the fixed communication network 5. The NIF 20 is connected to the fixed communication network 5 with layer-2 transmission lines, optical fibers, or the like. The NIF 20 detects the state of the interface with the fixed communication network 5. Examples of the state of the interface with the fixed communication network 5 include a state of connection, a state of disconnection, and a state of congestion.

The wireless controller 21 controls wireless communication between the base station apparatus 2 and the mobile station apparatus 4. Specifically, the wireless controller 21 controls communication connections (sessions), communication channels (transport channels), and the like according to a given communication control protocol. An example of the communication control protocol is the 3rd Generation Partnership Project (3GPP). The wireless controller 21 controls the communication connections and communication channels according to, for example, the Radio Resource Control (RRC) protocol. To perform processing involved in communication with the mobile station apparatus 4, the wireless controller 21 is connected to the CN simulating unit 28 or a CN processing unit 50 in the CN node apparatus 3 as an upper node in a core network.

The wireless transceiving unit 22 performs wireless communication between the base station apparatus 2 and the mobile station apparatus 4. The wireless transceiving unit 22 transmits and receives wireless signals, in physical channels, that conform to the given communication control protocol. The broadcast signal receiving unit 23 receives a broadcast signal transmitted from the disaster notice apparatus 6 through the wireless transceiving unit 22. The broadcast signal receiving unit 23 notifies the state determining unit 27 of the contents of the received broadcast signal.

The base station state determining unit 24 determines the operation state of other base stations in the vicinity of the base station apparatus 2. For example, the base station state determining unit 24 measures the state of radio signal transmission from another base station in the vicinity of the base station apparatus 2 and determines whether the operation state of the other base station is normal. The base station state determining unit 24 notifies the state determining unit 27 of the determination result. The base station information storage unit 25 stores base station information about the base station apparatus 2. The base station information includes the base station identifier of the base station apparatus 2 and the area in which the base station apparatus 2 is installed.

The power supply monitoring unit 26 monitors the power supply state of the base station apparatus 2. The power supply monitoring unit 26 notifies the state determining unit 27 of a change in the power supply state. The state determining unit 27 determines states described below, and if the states satisfy given conditions, switches the connection destination of the wireless controller 21 from the CN processing unit 50 of the CN node apparatus 3 to the CN simulating unit 28.

(1) Contents of the broadcast signal. If the broadcast signal indicates information about the occurrence of an earthquake, for example, the contents of the broadcast signal are a magnitude, the maximum earthquake intensity, a target area, and the like.

(2) Power supply state detected by the power supply monitoring unit 26, indicating that, for example, the power supply of the base station apparatus 2 is an external power supply or an internal battery.

(3) Operation state, determined by the base station state determining unit 24, of another base station apparatus 2 in the vicinity. For example, the state of radio signal transmission from the other base station apparatus 2 in the vicinity.

(4) State of the interface with the fixed communication network 5. For example, a state of connection, disconnection, congestion.

The states in (1) to (4) above are only examples of states referred to when the connection destination of the wireless controller 21 is switched; it is not intended that all of these states are desirably determined at all times. In addition, states other than the above states may be determined.

The CN simulating unit 28 simulates part or all of processing executed by the CN processing unit 50 in the CN node apparatus 3. The CN simulating unit 28 generates simulated signals for control signals to be transmitted by the CN processing unit 50 to the mobile station apparatus 4, and outputs the simulated signals to the wireless controller 21. For example, the CN processing unit 50 simulates a control signal sequence, executed by the core network, that conforms to the non-access stratum (NAS) protocol.

Now, communication performed by a mobile station at normal times will be described. In mobile telephone services, when a mobile station is turned on, the mobile station receives broadcast information that is transmitted from the nearest base station. The broadcast information includes location information for the base station and other information. When the mobile station receives the broadcast information, the mobile station may know the area in which the mobile station is present. Afterwards, the mobile station transmits specific identification information to the base station as preferable, and requests that the location be registered. The location registration request is included in the attach request.

Upon receipt of the attach request, the base station transfers the attach request to the core network. The core network uses the identification information of the mobile station and other information, which are included in the attach request, to authenticate the mobile station. If it is determined that the mobile station is normal, the core network transmits a reply to the base station in response to the attach request. The base station receives the reply, which has been transmitted from the core network in response to the attach request, and transfers the reply to the mobile station. Thus, the communication carrier may locate the current locations of all mobile stations and may provide mobile telephone services.

As seen from the above description, when the mobile station transmits an attach request to the core network through the base station, it is desirable for the mobile station to receive broadcast information from the base station. Furthermore, when the mobile station receives information about an area other than the location registration area which is retained in the mobile station (that is, the last location registration area in which the mobile station was present), the mobile station transmits an attach request to newly register the received location.

That is, the base station transmits broadcast information in which the identifier of a false location registration area (which is different from true location registration area) is included so that the mobile station that receives the broadcast information determines that the mobile station has entered a new location registration area and transmits an attach request.

The NAS protocol is used for communication between the mobile station and the core network. Therefore, the base station has NAS protocol functions in order to read control signals that conform to the NAS protocol. The mobile station and core network use the NAS protocol to perform authentication by using the identification information transmitted from the mobile station to the core network and to obtain information about the mobile station from the MME in the last location registration area in which the mobile station was present.

The simulated signals described above are not limited to replies transmitted in response to attach requests. The simulated signals may be replies transmitted in response to location registration requests and hand-over requests.

If it is determined that the core network is disconnected, the CN simulating unit 28 transmits broadcast information to the mobile station apparatus 4. It is desirable that the identifier of a false location registration area (which is different from true location registration area) be included.

Next, the CN simulating unit 28 transmits, to the mobile station apparatus 4, a simulated signal, which is a reply signal, transmitted from the core network in response to the attach request from the mobile station apparatus 4. Thus, even if the mobile station apparatus 4 is not actually attached to the communication system 1, the CN processing unit 50 causes the mobile station apparatus 4 to determine that the mobile station apparatus 4 is attached. The CN simulating unit 28 also transmits a simulated reply signal of the core network to the mobile station apparatus 4 in response to the transmission of a voice call or packet call from the mobile station apparatus 4. Thus, the CN processing unit 50 detects a transmission from the mobile station apparatus 4 and counts the number of transmissions for each mobile station apparatus 4. To enable packet communication between the base station apparatus 2 and the mobile station apparatus 4, the CN simulating unit 28 also executes packet communication protocol processing.

The attach request includes an identifier specific to the mobile station apparatus 4. Therefore, the identifier may be stored. As a result, the location of the mobile station apparatus 4 may be found to be within in the cell range.

When the wireless controller 21 is connected to the CN simulating unit 28, the signal transceiving unit 29 transmits the mobile station apparatus 4 a request to measure the location of the mobile station apparatus 4, and receives location information for the mobile station apparatus 4 from the mobile station apparatus 4 as a response. Before transmitting the location measurement request, the signal transceiving unit 29 determines the timing at which to send the location measurement request according to the base station identifier included in the base station information. Accordingly, the timing at which location measurement requests are transmitted from a base station apparatus 2 to a mobile station apparatus 4 differs for each base station apparatus 2. The signal transceiving unit 29 stores the location information for the mobile station apparatus 4 in the location data storage unit 30. The location measurement request transmitted from the signal transceiving unit 29 may be measurement control (MC) conforming to the RRC protocol. A measurement report (MR), which is a response of the MC, may include the location information for the mobile station apparatus 4. In the descriptions below, an embodiment will be described in which, when location information is to be transmitted, the mobile station apparatus 4 transmits an MR that includes location information.

The location data storage unit 30 stores the location information for the mobile station apparatus 4, which is included in the MR received by the signal transceiving unit 29, and also stores the number of transmissions from mobile station apparatus 4, which are counted by the CN simulating unit 28. FIG. 4 illustrates an example of location data to be stored in the location data storage unit 30. The location information includes information elements "mobile station identifier", "transmission time", "GPS information", and "number of transmissions". The information element "mobile station identifier" is the identifier of the mobile station apparatus 4 that transmitted the MR. The information element "transmission time" indicates the time when the mobile station apparatus 4 transmitted the MR.

The information element "GPS information" is location information for the mobile station apparatus 4 that the mobile station apparatus 4 has measured using a Global Positioning System (GPS)-based location measurement method. The location information transmitted from the mobile station apparatus 4 includes information elements "latitudeSign", "latitude", "longitude", "Elevation Direction" and "elevation". The information element "latitudeSign" indicates whether the latitude is the north latitude or the south latitude. The information element "latitude" indicates latitude. The information element "longitude" indicates longitude. In this disclosure, we consider the case where the longitude is the east longitude. The information element "Elevation Direction" indicates whether the information element "elevation" represents a height or a depth with respect to sea level. The information element "elevation" indicates a height or a depth with respect to sea level. The information element "number of transmissions" is the number of transmissions from the mobile station apparatus 4.

For example, the entry on the first row of the location data in the example illustrated in FIG. 4 indicates that a mobile station apparatus 4 having identifier AAAA transmitted an MR at 11 hours, 22 minutes, 23 seconds and that the location of the mobile station apparatus 4 is latitude 35 degrees, 39 minutes, 30.992 seconds north and longitude 139 degrees, 44 minutes, 43.602 seconds east, with an elevation of 10 meters. The entry also indicates that the number of transmissions from the mobile station apparatus 4 having identifier AAAA is 4.

Although the location information is stored in this example, a first attach request may be stored instead. The attach request includes an identifier that may uniquely identify the mobile station apparatus 4. When the identifier is stored, therefore, the location of the mobile station apparatus 4 is found to be within the cell range of the base station apparatus 2.

Referring again to FIG. 3, the compiling and distributing unit 31 compiles the number of transmissions, counted by the CN simulating unit 28, from the mobile station apparatus 4 and adds the number of transmissions to the location data to be stored in the location data storage unit 30 as the information element "number of transmissions". The compiling and distributing unit 31 transmits the mobile station apparatus 4 the location data to be stored in the location data storage unit 30 through packet communication protocol processing executed by the CN simulating unit 28. The compiling and distributing unit 31 may encrypt the location data to be transmitted to the mobile station apparatus 4.

When the destination to which the wireless controller 21 is connected has switched from the CN simulating unit 28 to the CN processing unit 50 in the CN node apparatus 3, the compiling and distributing unit 31 transmits the location data that is to be stored in the location data storage unit 30 to the CN node apparatus 3.

The above operation in the NIF 20 is executed by the NIF circuit 14 illustrated in FIG. 2. The above operation in the wireless controller 21 is executed by the DSP 13. The above operation in the wireless transceiving unit 22 is executed by the wireless signal transceiving circuit 15. The above operations in the broadcast signal receiving unit 23, base station state determining unit 24, power supply monitoring unit 26, state determining unit 27, CN simulating unit 28, signal transceiving unit 29, and compiling and distributing unit 31 are executed by the CPU 10. The base station information stored in the base station information storage unit 25 is stored in the memory 12 or auxiliary storage unit 11. The location data stored in the location data storage unit 30 is stored in the auxiliary storage unit 11.

3. Example of the Structure of the CN Node Apparatus 3

3.1 Hardware Structure of the CN Node Apparatus 3

Figure 5:
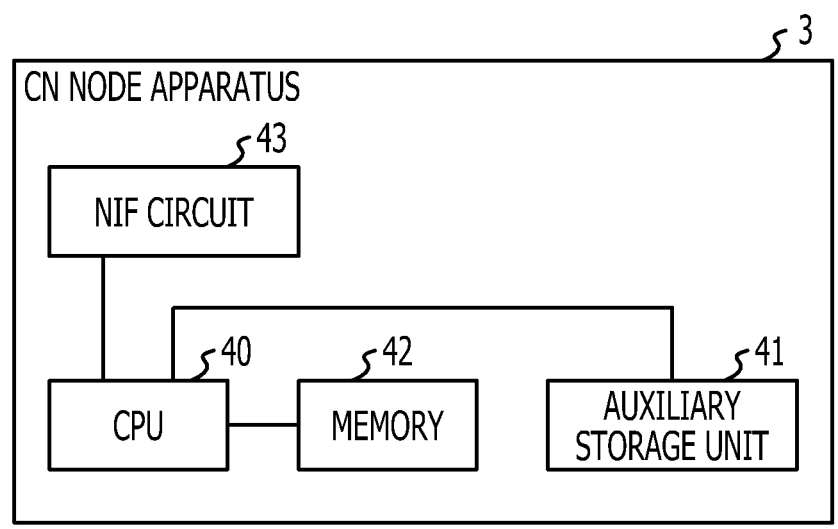
FIG. 5 illustrates an example of the hardware structure of a core network node apparatus.

Next, the structure of the CN node apparatus 3 will be described. FIG. 5 illustrates an example of the hardware structure of the CN node apparatus 3. The CN node apparatus 3 includes a CPU 40, an auxiliary storage unit 41, a memory 42, and a NIF circuit 43. The hardware structure illustrated in FIG. 5 is an example of a hardware structure that implements the CN node apparatus 3. Another hardware structure may be used if the hardware structure is able to execute processing described below.

The CPU 40, as commanded by computer programs stored in the auxiliary storage unit 41, controls the CN node apparatus 3 and performs compilation processing, described below, on location data for the mobile station apparatus 4 as well as processing to determine user search priority. The auxiliary storage unit 41 stores both the computer programs executed by the CPU 40 as well as data that is used during the execution of the computer programs. The auxiliary storage unit 41 may include a non-volatile storage unit, a read-only memory, or a hard disk. The memory 42 stores a program currently executed by the CPU 40 as well as data that is temporarily used by the program. The memory 42 may include a RAM. The NIF circuit 43 performs signal processing for signals transmitted and received in communication through the fixed communication network 5.

3.2 Functional Structure of the CN Node Apparatus 3

Figure 6:
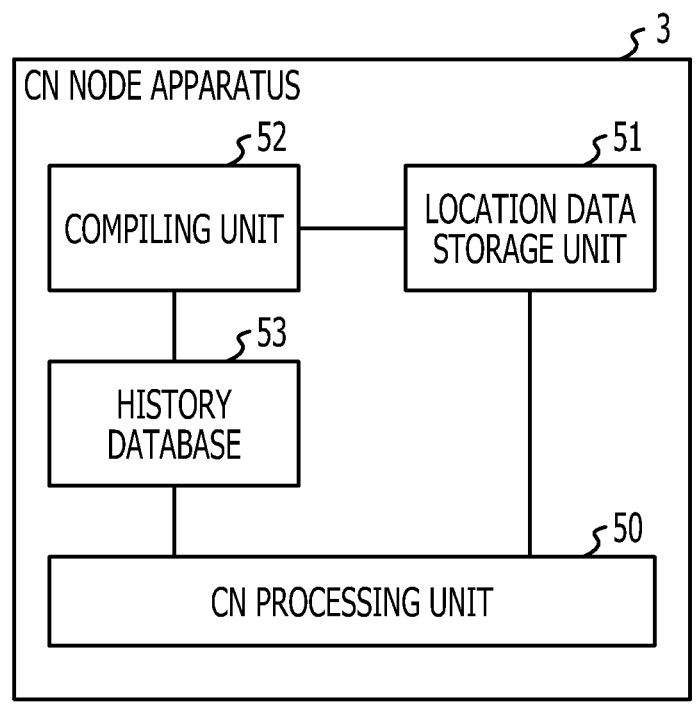
FIG. 6 is an example of a functional block diagram of the core network node apparatus.

Next, the functions of the CN node apparatus 3 implemented by the hardware structure described above will be described. FIG. 6 is an example of a functional block diagram of the CN node apparatus 3. The CN node apparatus 3 includes the CN processing unit 50, a location data storage unit 51, a compiling unit 52, and a history database 53. FIG. 6 mainly illustrates functions that are related to the descriptions below. The CN node apparatus 3 may include other constituent elements not illustrated in FIG. 6.

The CN processing unit 50 follows a given wireless communication protocol to perform signal processing related to the core network. In this embodiment, the CN processing unit 50 performs operations to:

(1) send broadcast signals received from the disaster notice apparatus 6 to the base station apparatus 2;

(2) store location data received from the base station apparatus 2 or mobile station apparatus 4 in the location data storage unit 51; and (3) count the number of voice calls and packet calls transmitted from the mobile station apparatus 4 to the CN node apparatus 3 and store the number in the history database 53.

Location data received from the base station apparatus 2 or mobile station apparatus 4 is compiled and the compiled data is stored in the location data storage unit 51. FIG. 7 is an example of compiled data that is stored in the location data storage unit 51. The compiled data includes information elements "mobile station identifier", "transmission time", "GPS information", "number of transmissions", "base station information", and "search priority". The information elements "mobile station identifier", "transmission and "GPS information" are the same as the information elements having the same names in the location data described with reference to FIG. 4.

"CN simulation" in the information element "number of transmissions" indicates the number of transmissions from the mobile station apparatus 4, which have been counted by the CN processing unit 50 in the base station apparatus 2. "CN" in the information element "number of transmissions" indicates the number of transmissions from the mobile station apparatus 4, which have been counted by the CN simulating unit 28 in the base station apparatus 2. The value of the information element "CN simulation" is obtained from the information element "number of transmissions" in the location data received from the base station apparatus 2 or mobile station apparatus 4. The value of the information element "CN" is obtained from the history database 53.

"Location information acquiring base station" in the information element "base station information" indicates the identifier of the base station apparatus 2 that has received an MR that includes the information element "GPS information" from the mobile station apparatus 4. "Travel history" in the information element "base station information" indicates whether location data transmitted from the mobile station apparatus 4 to the CN node apparatus 3 has passed through another base station apparatus 2 other than the base station apparatus 2 that transmitted the MR, as described later in 5.3, "Transmission of location data from the base station apparatus 2 to the CN node apparatus 3 and mobile station apparatus 4". If the location data has passed through a base station apparatus 2 other than the base station apparatus 2 that transmitted the MR, the significance is that the mobile station apparatus 4 has traveled. The identifier of the base station apparatus 2 through which the location data has passed is also stored in the information element "travel history". The information element "search priority" indicates a search priority at which the user of the mobile station apparatus 4 is searched for.

For example, the entry on the first row of the compiled data in the example illustrated in FIG. 7 indicates, for the mobile station apparatus 4 having identifier AAAA, that the number of transmissions that has been counted by the CN simulating unit 28 in the base station apparatus 2 is 4 and the number of transmissions counted by the CN processing unit 50 is 1. The entry also indicates that the mobile station apparatus 4 having identifier AAAA transmitted an MR to a base station apparatus 2 having identifier 001, traveled thereafter, and then transmitted location data to a base station apparatus 2 having identifier 002 while being connected thereto. The search priority assigned to the user of the mobile station apparatus 4 having identifier AAAA is 0, which is the lowest priority.

The compiling unit 52 reads out, from the history database 53, the number of transmissions from the mobile station apparatus 4 for which compiled data has been stored in the location data storage unit 51, and adds the read-out number to the compiled data to be stored in the location data storage unit 51 as the information element "CN". The compiling unit 52 also determines a search priority at which the user of the mobile station apparatus 4 is searched for with reference to:

(1) the number of transmissions, and (2) the travel history.

Information in (1) and (2) above is an example of information referred to in order to determine a search priority and there is no intention that the values of all the above information are desirably determined at all times. Other information may be referenced besides the information listed above.

The history database 53 records the number of voice calls and packet calls that originate from the mobile station apparatus 4 and have been processed by the CN processing unit 50.

The above processing in the CN processing unit 50 is executed by the CPU 40 and NIF circuit 43. The above processing in the compiling unit 52 is executed by the CPU 40. Compiled data stored in the location data storage unit 51 is stored in the auxiliary storage unit 41. Information about the number of transmissions stored in the history database 53 is also stored in the auxiliary storage unit 41.

4. Example of the Structure of the Mobile Station Apparatus 4

4.1 Hardware Structure of the Mobile Station Apparatus 4

Figure 8:
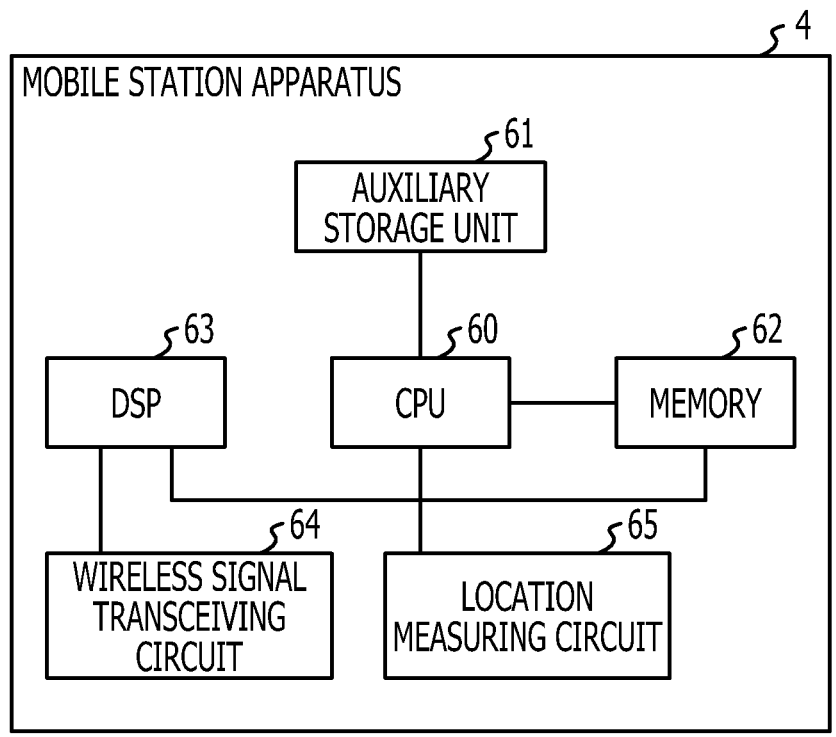
FIG. 8 is an example of the hardware structure of a mobile station apparatus.

Next, the structure of the mobile station apparatus 4 will be described. FIG. 8 illustrates an example of the hardware structure of the mobile station apparatus 4. The mobile station apparatus 4 includes a CPU 60, an auxiliary storage unit 61, a memory 62, a DSP 63, a wireless signal transceiving circuit 64, and a location measurement circuit 65. The hardware structure illustrated in FIG. 8 is an example of a hardware structure that implements the mobile station apparatus 4. A different hardware structure may be used if the different hardware structure is able to execute processing described below.

The CPU 60 follows computer programs stored in the auxiliary storage unit 61 to perform information processing for application software used by the user of the mobile station apparatus 4, processing to create location data for the mobile station apparatus 4, described later, and processing to store the created location data. The auxiliary storage unit 61 stores computer programs executed by the CPU 60 as well as data used during the execution of the computer programs. The auxiliary storage unit 61 may include a non-volatile storage unit, a ROM, and a hard disk. The memory 62 stores a program currently executed by the CPU 60 as well as data that is temporarily used by the program. The memory 62 may include a RAM.

The DSP 63 controls wireless communication with the base station apparatus 2. The memory 62 is also used to temporarily store data used in processing by the DSP 63. The wireless signal transceiving circuit 64 transmits and receives wireless signals that are used in wireless communication with the base station apparatus 2. The location measurement circuit 65 measures the current location of the mobile station apparatus 4. For example, the location measurement circuit 65 measures the current location of the mobile station apparatus 4 by using a location measurement method based on GPS or advanced forward link trilateration (AFLT).

4.2 Functional Structure of the Mobile Station Apparatus 4

Figure 9:
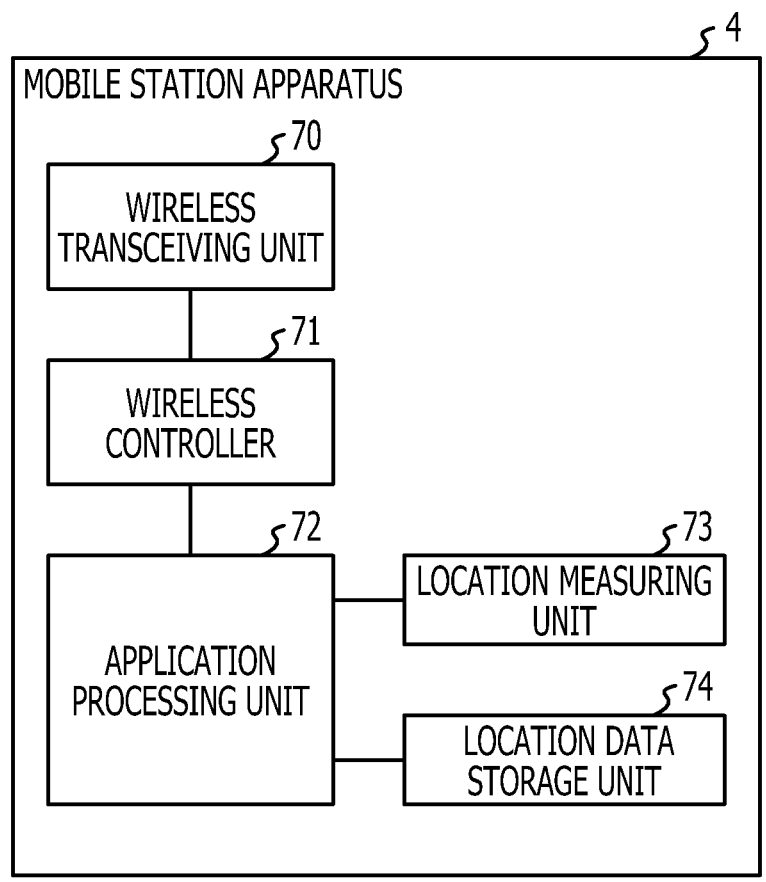
FIG. 9 is an example of a functional block diagram of the mobile station apparatus.

Next, the functions of the mobile station apparatus 4 that is implemented by the hardware structure described above will be described. FIG. 9 is an example of a functional block diagram of the mobile station apparatus 4. The mobile station apparatus 4 includes a wireless transceiving unit 70, a wireless controller 71, an application processing unit 72, a location measurement unit 73, and a location data storage unit 74. FIG. 9 mainly illustrates functions related to the descriptions below; the mobile station apparatus 4 may include other constituent elements not illustrated in FIG. 9.

The wireless transceiving unit 70 carries out wireless communication between the mobile station apparatus 4 and the base station apparatus 2. Specifically, the wireless transceiving unit 70 transmits and receives wireless signals in physical channels according to the above given communication control protocol. The wireless controller 71 controls wireless communication between the mobile station apparatus 4 and the base station apparatus 2. The wireless controller 71 controls communication connections (sessions), communication channels (transport channels), and the like according to the given communication control protocol.

The application processing unit 72 causes the location measurement unit 73 to measure the current location of the mobile station apparatus 4 in response to a location measurement request from the base station apparatus 2. When location data is transmitted from the base station apparatus 2 to the mobile station apparatus 4, the mobile station apparatus 4 receives the location data and the application processing unit 72 stores the received location data in the location data storage unit 74. After the location data has been received, if the mobile station apparatus 4 may be normally attached to the communication system 1 by being connected to, for example, another base station apparatus 2 other than the base station apparatus 2 that transmitted the location data, the application processing unit 72 transmits the location data stored in the location data storage unit 74 to the CN node apparatus 3.

FIG. 10 illustrates an example of location data that is stored in the location data storage unit 74. The location data includes header information in addition to the information elements of the location data from the location data storage unit 30 of the base station apparatus 2, which was described with reference to FIG. 4. The header information includes information elements "source base station identifier", "broadcast signal identifier", and "date and time of transmission".

The information element "source base station identifier" indicates the identifier of the base station apparatus 2 that transmitted the location data received by the mobile station apparatus 4. The information element "broadcast signal identifier" indicates the identifier of a broadcast signal that caused a location measurement request to be transmitted to the base station apparatus 2 in order to acquire the location data. The information element "date and time of transmission" indicates the date and time when the base station apparatus 2 transmitted the location data to the mobile station apparatus 4. The location data in the example in FIG. 10 indicates that the location data was transmitted from a base station apparatus 2 having identifier 001 at 11:22:33 on Nov. 22, 2011. The location data also indicates that when the base station apparatus 2 received a broadcast signal having identifier 0123, the base station apparatus 2 acquired the location data.

The above operation in the wireless transceiving unit 70 is executed by the wireless signal transceiving circuit 64. The above operation in the wireless controller 71 is executed by the DSP 63. The above operation in the application processing unit 72 is executed by the CPU 60. The above operation in the location measurement unit 73 is executed by the location measurement circuit 65. The location data stored in the location data storage unit 74 is stored in the auxiliary storage unit 61.

5. Operations

The operations of the communication system 1 when a disaster occurs are described below. The operations of the communication system 1 are classified into the following four categories in time order.

(1) Detection of a disaster and connection between the wireless controller 21 and the CN simulating unit 28

(2) Acquisition of location data for the mobile station apparatus 4 by the base station apparatus 2

(3) Transmission of location data from the base station apparatus 2 to the CN node apparatus 3 and mobile station apparatus 4

(4) Compilation of location data at the CN node apparatus 3 and determination of a search priority The operations in (1) to (4) above will be described below.

5.1 Detection of a Disaster and Connection between the Wireless Controller 21 and the CN Simulating Unit 28

Figure 11:
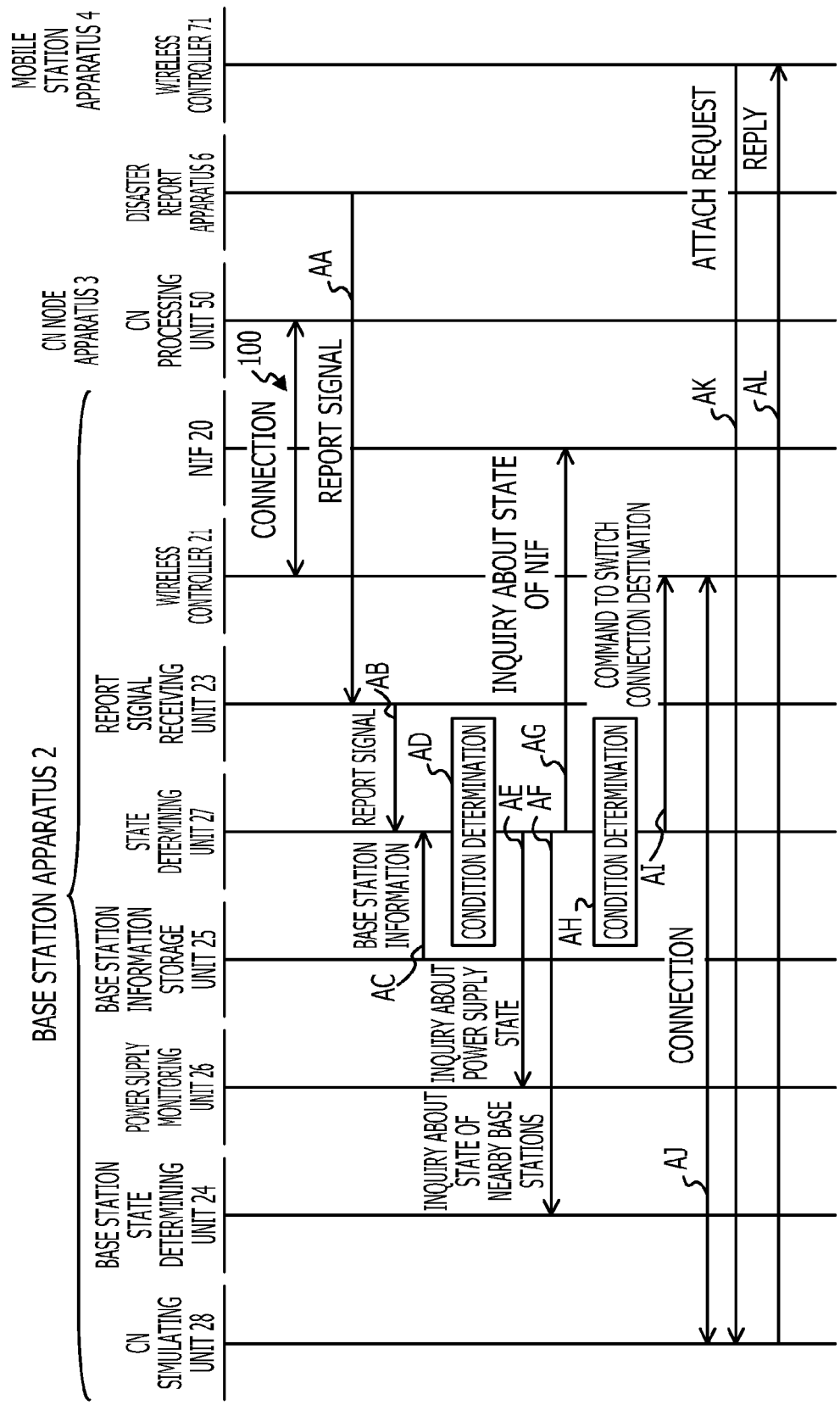
FIG. 11 illustrates an example of an operation sequence followed to detect the occurrence of a disaster and switch the connection destination of a wireless control unit.

FIG. 11 illustrates an example of an operation sequence followed to detect the occurrence of a disaster and switch the connection destination of the wireless control unit 21. In the descriptions below, a series of operations that will be described with reference to FIG. 11 may be interpreted as a method that includes a plurality of procedures. In this case, the term operation may be read as referring to the term step. This is also true for FIGS. 11, 14 to 16, 21, 23, and 26.

Before a disaster occurs, the wireless controller 21 is connected to the CN processing unit 50 in the CN node apparatus 3 as indicated by the arrow 100. If a disaster occurs and an emergency disaster warning is generated in operation AA, the disaster notice apparatus 6 transmits a broadcast signal to the CN node apparatus 3. The broadcast signal receiving unit 23 in the base station apparatus 2 receives the broadcast signal through the CN processing unit 50 in the CN node apparatus 3 and the wireless controller 21. FIG. 12 illustrates an example of the format of the broadcast signal received by the broadcast signal receiving unit 23.

The broadcast signal includes information elements "type", "predicted arrival time", "target area", "magnitude", and "maximum earthquake intensity". The information element "type" indicates the type of a disaster. For example, "type" may be "earthquake" or "tsunami". The information element "predicted arrival time" indicates the predicted arrival time of the disaster. The information element "target area" indicates the area to notify of the occurrence of a disaster via a broadcast signal. If the type of the disaster is an earthquake, the information elements "magnitude" and "maximum earthquake intensity" indicate the magnitude and the maximum predicted earthquake intensity in the target area, respectively.

FIG. 12 also displays examples of the information elements of the broadcast signal. The broadcast signal in the example in FIG. 12 indicates that a seismic wave will reach the target area oo Prefecture, xx City at 11:22:33, the magnitude of the earthquake is 8.0, and the maximum predicted earthquake intensity in oo Prefecture, xx City is 5.

Referring again to FIG. 11, the broadcast signal receiving unit 23 transmits the broadcast signal to the state determining unit 27 in operation AB. In operation AC, the state determining unit 27 reads out the base station information of the base station apparatus 2 from the base station information storage unit 25. FIG. 13 illustrates an example of the format of the base station information. The information items of the base station information are classified into "basic information", which includes a "base station identifier" and "installation area", and "location measurement start conditions", which includes "magnitude", "maximum earthquake intensity", "power supply state", "state of nearby base stations", and "state of NIF".

The information element "base station identifier" indicates the identifier of the base station apparatus 2 and the information element "installation area" indicates the area in which the base station apparatus 2 is installed. The information elements "magnitude", "maximum earthquake intensity", "state of nearby base stations", and "state of NIF" indicate some conditions under which the base station apparatus 2 acquires the location information for a mobile station apparatus 4 when a disaster occurs. FIG. 13 also indicates examples of the information elements of the base station information. The base station information in the example in FIG. 13 indicates that the identifier of the base station apparatus 2 is 001 and the installation area is oo Prefecture, xx City. This example also indicates that location information for the mobile station apparatus 4 is acquired when the magnitude is 6.0 or more, the maximum predicated earthquake intensity is 4 or more, electric power is supplied from an internal power supply, other surrounding base station apparatuses send no radio signals, and the NIF 20 remains disconnected from the fixed communication network 5.

Referring again to FIG. 11, the state determining unit 27 determines in operation AD whether the received broadcast signal satisfies conditions under which the base station apparatus 2 acquires the location information for the mobile station apparatus 4. FIG. 14 illustrates a process executed by the state determining unit 27 to make a determination about the broadcast signal.

The state determining unit 27 determines in operation BA whether the target area to which to send the broadcast signal matches the installation area in the base station information. If the target area matches the installation area (the result in operation BA is Y), the process proceeds to operation BB. If not (the result in operation BA is N), the process proceeds to operation BE.

The state determining unit 27 determines in operation BB whether the magnitude indicated in the broadcast signal is greater than or equal to the magnitude preset as a location measurement start condition in the base station information. If the magnitude indicated in the broadcast signal is greater than or equal to the magnitude preset as a location measurement start condition in the base station information (the result in operation BB is Y), the process proceeds to operation BC. If not (the result in operation BB is N), the process proceeds to operation BE.

The state determining unit 27 determines in operation BC whether the maximum earthquake intensity indicated in the broadcast signal is greater than or equal to the maximum earthquake intensity preset as a location measurement start condition in the base station information. If the maximum earthquake intensity indicated in the broadcast signal is greater than or equal to the maximum earthquake intensity preset as a location measurement start condition in the base station information (the result in operation BC is Y), the process proceeds to operation BD. If not (the result in operation BC is N), the process proceeds to operation BE.

In operation BD, the state determining unit 27 determines to make decisions on other location measurement start conditions in operations AE to AH below and completes the process. In operation BE, the state determining unit 27 determines not to acquire location information for the mobile station apparatus 4 and completes the process.

Referring again to FIG. 11, in operation AE, the state determining unit 27 makes an inquiry to the power supply monitoring unit 26 about the state of the power supply in the base station apparatus 2. In operation AF, the state determining unit 27 makes an inquiry to the base station state determining unit 24 about the operation state of a nearby base station, for example, about the state of radio signal transmission from another base station. In operation AG, the state determining unit 27 makes an inquiry to the NIF 20 about the state of the interface with the fixed communication network 5.

Figure 15:
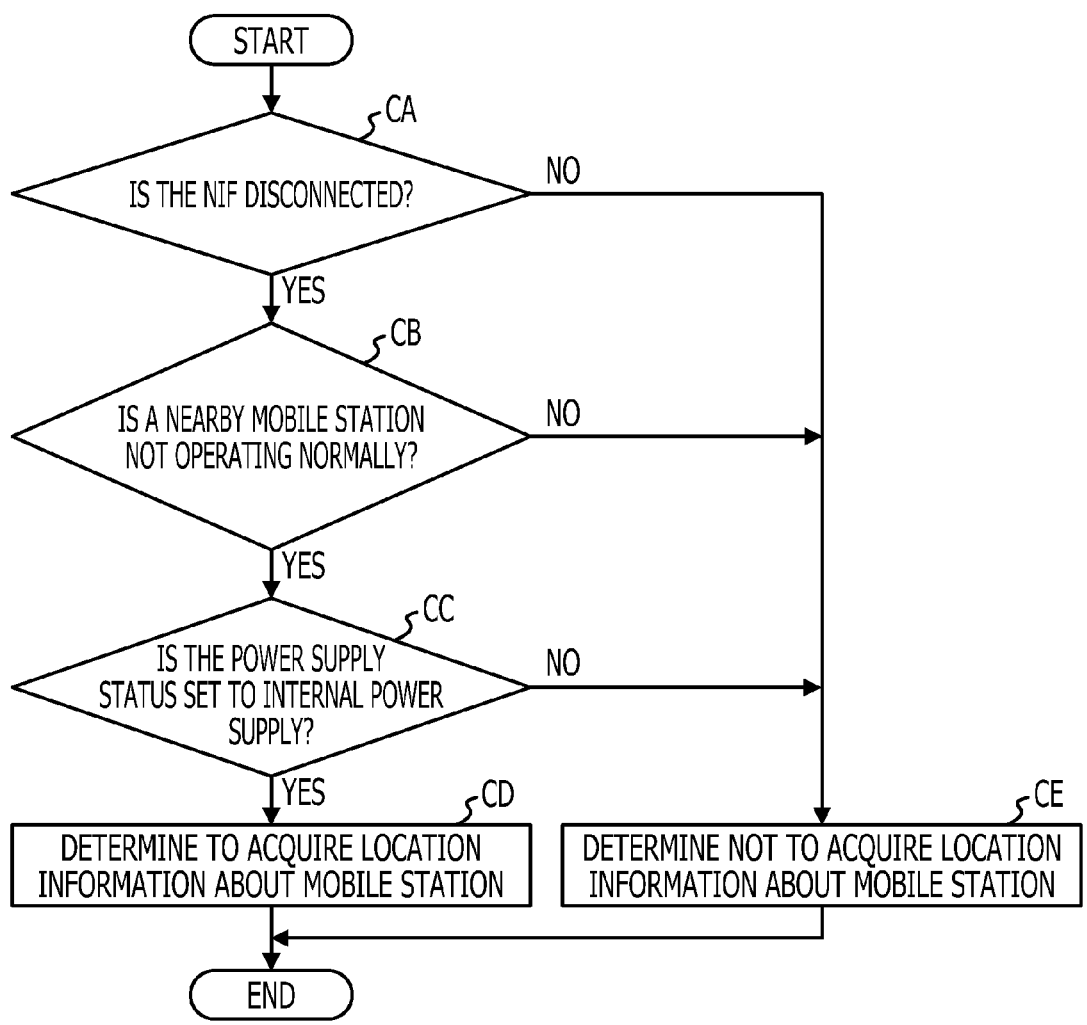
FIG. 15 illustrates processing to determine whether to acquire location information.

In operation AH, the state determining unit 27 determines whether to acquire location information of the mobile station apparatus 4. FIG. 15 illustrates a process for determining whether to acquire location information of the mobile station apparatus 4.

In operation CA, the state determining unit 27 determines the state of the interface between the NIF 20 and the fixed communication network 5. If the interface is disconnected (the result in operation CA is Y), the process proceeds to operation CB. If not (the result in operation CA is N), the process proceeds to operation CE.

In operation CB, the state determining unit 27 determines the operation state of a nearby base station. When the nearby base station is not operating normally, for example, if no radio signal is transmitted from the nearby base station apparatus 2 (the result in operation CB is Y), the process proceeds to operation CC. If the nearby base station apparatus 2 is operating normally (the result in operation CB is N), the processing proceeds to operation CE.

In operation CC, the state determining unit 27 determines whether the base station apparatus 2 is receiving electric power from an internal power supply. If the base station apparatus 2 is receiving electric power from an internal power supply (the result in operation CC is Y), the process proceeds to operation CD. If the base station apparatus 2 is receiving electric power from an external power supply (the result in operation CC is N), the process proceeds to operation CE.

In operation CD, the state determining unit 27 determines to acquire location information of the mobile station apparatus 4 and terminates the process. In operation CE, the state determining unit 27 determines not to acquire location information of the mobile station apparatus 4 and completes the process.

Referring again to FIG. 11, processing to acquire location information for the mobile station apparatus 4 will be described below. In operation AI, the state determining unit 27 outputs, to the wireless controller 21, a connection destination switching command to switch the connection destination from the CN processing unit 50 in the CN node apparatus 3 to the CN simulating unit 28. In operation AJ, the wireless controller 21 switches the connection destination to the CN simulating unit 28.

Since the wireless controller 71 in the mobile station apparatus 4 failed to be attached to the communication system 1 due to a disconnection between the base station apparatus 2 and the CN node apparatus 3, the wireless controller 71 transmits an attach request to the wireless controller 21 in the base station apparatus 2 in operation AK. The wireless controller 21 receives the attach request and transmits the attach request to the CN simulating unit 28.

In operation AL, the CN simulating unit 28 generates a simulated signal for a reply signal that the core network returns in response to the attach request from the mobile station apparatus 4. The CN simulating unit 28 then outputs the simulated signal to the wireless controller 21. The wireless controller 21 receives the simulated signal and transmits the simulated signal to the mobile station apparatus 4. The wireless controller 21, which received the simulated signal, determines that the mobile station apparatus 4 is attached to the communication system 1, and permits the mobile station apparatus 4 to send an MR in response to a location measurement request and transmit voice calls and packet calls made by the user.

5.2 Acquisition of Location Information for the Mobile Station Apparatus 4 by the Base Station Apparatus 2

Figure 16:
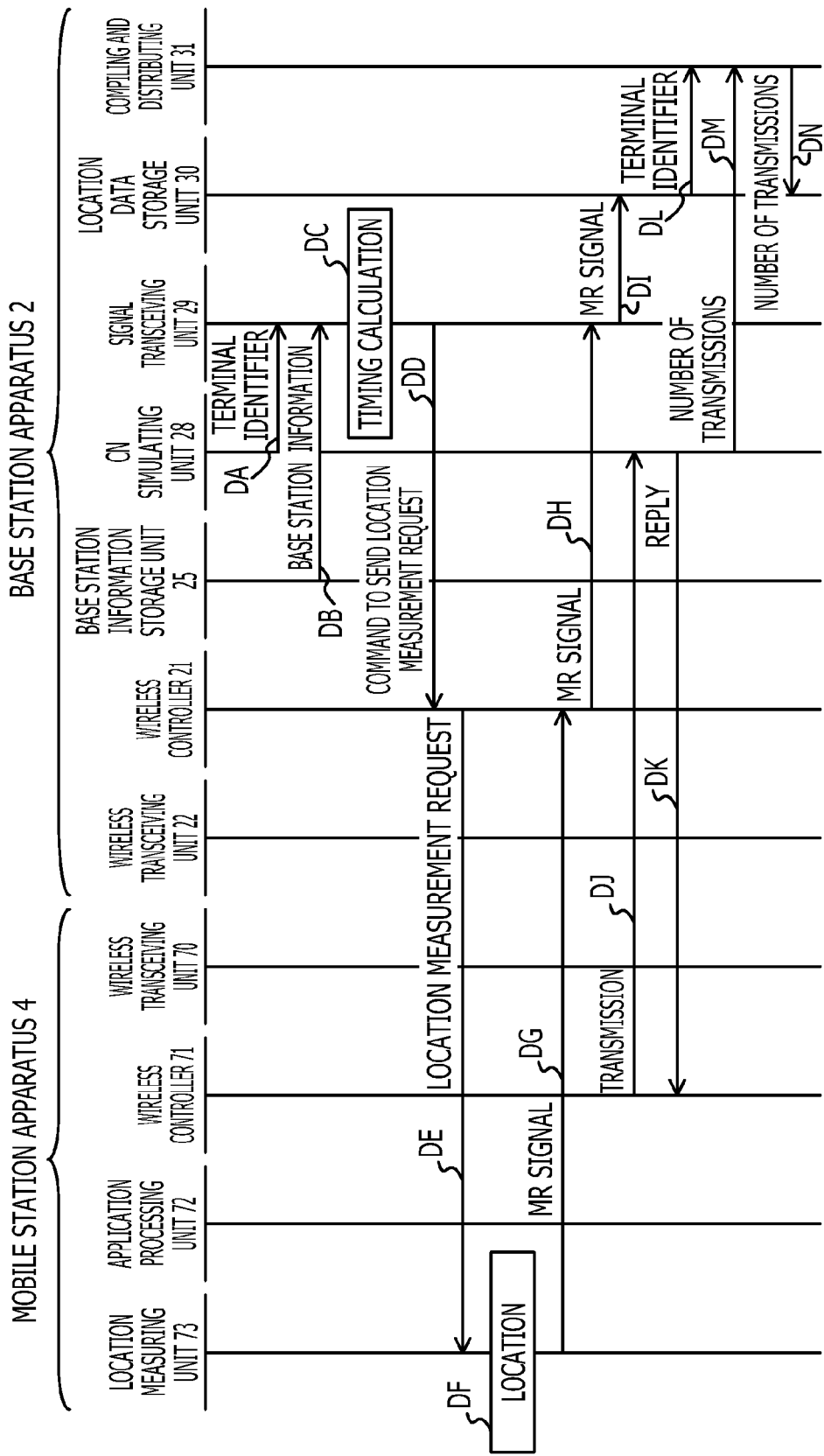
FIG. 16 illustrates an example of an operation sequence followed when acquiring location information for the mobile station.

FIG. 16 illustrates an example of an operation sequence followed when acquiring location information of the mobile station apparatus 4. In operation DA, the signal transceiving unit 29 makes an inquiry to the CN simulating unit 28 about the identifier of the mobile station apparatus 4 that transmitted a connection request to the cell of the base station apparatus 2. The CN simulating unit 28 transmits, to the signal transceiving unit 29, the identifier of the mobile station apparatus 4, which was extracted when the attach request from the mobile station apparatus 4 was received.

In operation DB, the signal transceiving unit 29 reads out the base station identifier in the base station information, which is stored in the station apparatus information storage unit 25. In operation DC, the signal transceiving unit 29 determines the transmission time at which to send a location measurement request to the mobile station apparatus 4, according to the base station identifier included in the base station information. Since the transmission time for when to send a location measurement request is determined according to the base station identifier as described above, different base station apparatuses 2 send location measurement requests at different times. As a result, even if more electric power is used to send a location measurement request and increase accuracy of reception by the mobile station apparatus 4, it may be possible to suppress location measurement request interference and congestion between base station apparatuses 2.

For example, the signal transceiving unit 29 determines a transmission time at which to send a location measurement request by the equation below.

$$\text{Transmission time} = \text{base station identifier} \times \text{coefficient} + \text{reference time}$$

The reference time may be, for example, the time of the broadcast signal or the time at which the external power supply is lost.

In operation DD, the signal transceiving unit 29 outputs, to the wireless controller 21, a command to send a location measurement request. FIG. 17 illustrates an example of the signal format of a command to send a location measurement request. The example in FIG. 17 indicates a case where the location measurement request is MC. The transmission command includes information elements "MC signal type", "transmission time", and "transmission power". The information element "MC signal type" specifies details of measurement requested for the mobile station apparatus 4. The information element "transmission time" indicates when to send a location measurement request. The information element "transmission power" indicates electric power used to send the location measurement request. FIG. 17 also indicates an example of a command to send a location measurement request. The example transmission command in FIG. 17 is a command to send a location measurement request for GPS-based location measurement to the mobile station apparatus 4 after one second has elapsed with the maximum electric power.

Referring again to FIG. 16, in operation DE, the wireless controller 21 transmits a location measurement request to the mobile station apparatus 4 via the wireless transceiving unit 22. In operation DF, the application processing unit 72 measures the current location of the mobile station apparatus 4, via the location measurement unit 73, in response to the location measurement request from the base station apparatus 2. In operation DG, the application processing unit 72 transmits, to the base station apparatus 2, an MR signal indicating the current location to the mobile station apparatus 4 according to the location measurement result obtained from the location measurement unit 73. The wireless controller 21 in the base station apparatus 2 receives the MR signal. FIG. 18 illustrates an example of an MR signal transmitted by the mobile station apparatus 4.

The example in FIG. 18 indicates an MR signal in a case where the mobile station apparatus 4 has carried out location measurement using a GPS-based location measurement method. The information elements of the MR signal is classified into "mobile station information" "time information", and "GPS information". The classification "mobile information" includes an information element "mobile station identifier". The classification "time information" includes an information element "transmission time". The classification "GPS information" includes information elements "latitudeSign", "latitude", "longitude", "elevation direction", and "elevation".

The information element "mobile station identifier" is the identifier of the mobile station apparatus 4 that transmitted an MR signal. The information element "transmission time" indicates when the MR signal was transmitted. The information elements of the classification "GPS information" indicate location information for the measured mobile station apparatus 4; the information element "latitudeSign" indicates whether the latitude is north or south. The information element "latitude" indicates latitude. The information element "longitude" indicates longitude. The information element "elevation direction" indicates whether the elevation is a height or a depth with respect to sea level. The information element "elevation" indicates elevation.

FIG. 18 also indicates an example of a MR signal. The MR signal in the example in FIG. 18 indicates that the identifier of the mobile station apparatus 4 that transmitted the MR signal is AAAA and that the MR signal was transmitted at 11:22:33. The MR signal also indicates that the location of the mobile station apparatus 4 is at 35 degrees, 39 minutes, 30.992 seconds north, and 139 degrees, 44 minutes, 43.602 seconds longitude east, with an elevation of 10 meters.

Referring again to FIG. 16, in operation DH, the wireless controller 21 transmits the MR signal to the signal transceiving unit 29. In operation DI, the signal transceiving unit 29 writes information, which is included in the MR signal, about the location of the mobile station apparatus 4 to the location data stored in the location data storage unit 30.

FIG. 19 illustrates an example of the contents of location data when a plurality of MR signals were received. At this point in time, only the identifiers AAAA to ZZZZ, as well as the transmission time and GPS information for each mobile station apparatus 4 are stored; the information element "number of transmissions" is not yet recorded.

Referring again to FIG. 16, in operation DJ, the mobile station apparatus 4 transmits a voice call or packet call. In operation DK, the CN simulating unit 28 generates a simulated response signal to be transmitted from the core network in response to the voice call or packet call transmitted by the mobile station apparatus 4. The CN simulating unit 28 also counts the number of transmissions for each mobile station apparatus 4. The wireless controller 21 transmits the simulated signal to the mobile station apparatus 4.

In operation DL, the compiling and distributing unit 31 acquires the identifier of the mobile station apparatus 4 whose location information was included in location data registered in the location data storage unit 30. In operation DM, the compiling and distributing unit 31 makes an inquiry to the CN simulating unit 28 about the number of transmissions made by the mobile station apparatus 4 having the acquired identifier. In operation DN, the number of transmissions that are made by the mobile station apparatus 4 and have been counted by the CN simulating unit 28 is added to the location data stored in the location data storage unit 30 as the information element "number of transmissions".

FIG. 20 illustrates an example of details for location data items, each of which includes the registered number of transmissions. In this example, the number of transmissions made by the mobile station apparatus 4 having identifier AAAA is recorded as 4 and the number of transmissions made by a mobile station apparatus 4 having identifier ZZZZ is recorded as 0.

5.3 Transmission of Location Data from the Base Station Apparatus 2 to the CN Node Apparatus 3 and Mobile Station Apparatus 4

Figure 21:
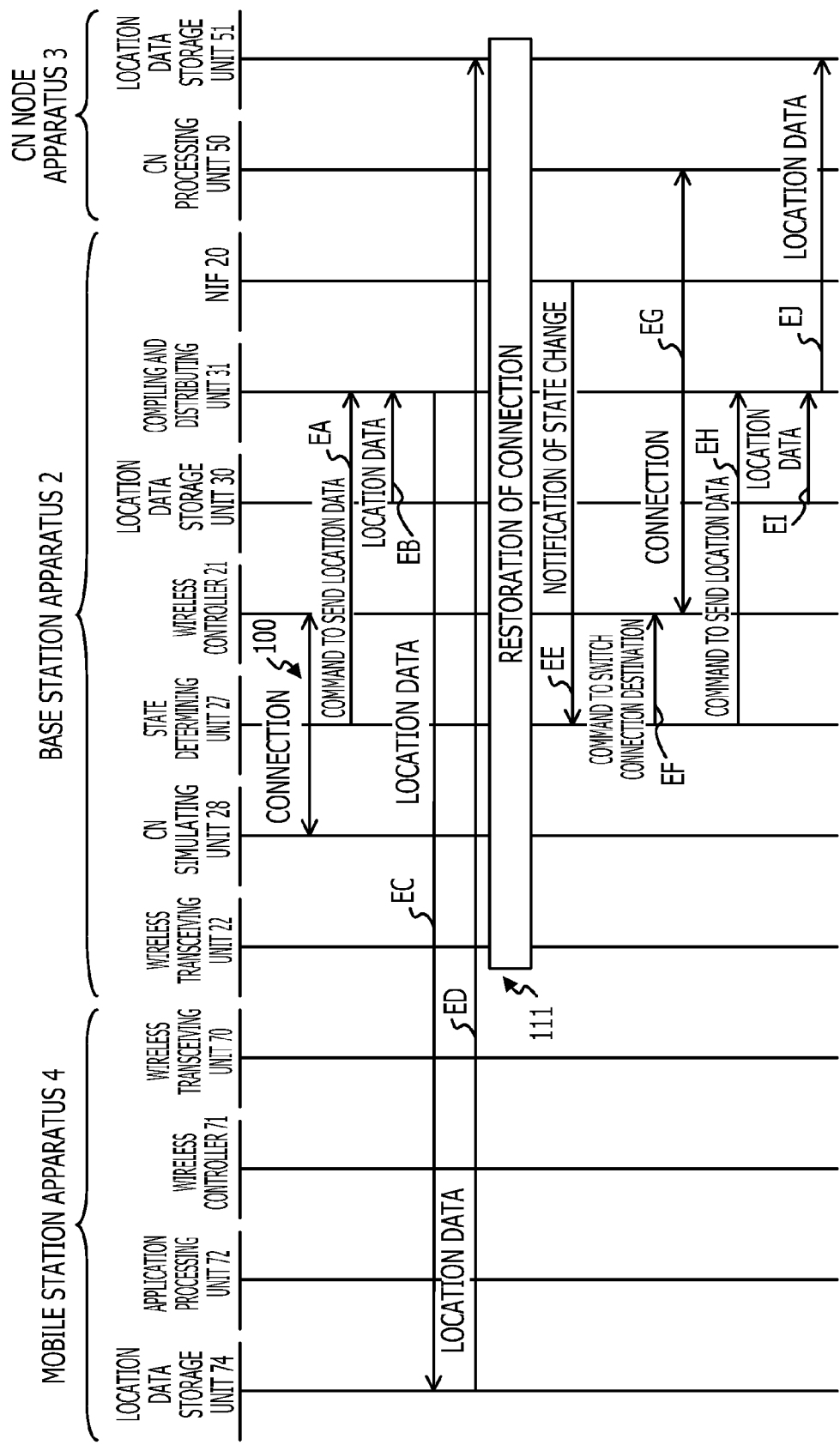
FIG. 21 illustrates an example of an operation sequence that the base station follows to send location data.

Next, operations to send location data from the base station apparatus 2 to the CN node apparatus 3 and mobile station apparatus 4 will be described. FIG. 21 illustrates an example of an operation sequence that is followed by the base station apparatus 2 to send location data. At this point, as illustrated by the arrow 110, the connection between the base station apparatus 2 and the fixed communication network 5 has not recovered, so the wireless controller 21 is assumed to be connected to the CN simulating unit 28.

After the number of transmissions has been written to the location data, in operation EA, the state determining unit 27 outputs, to the compiling and distributing unit 31, a command to output location data that is stored in the location data storage unit 30 to the mobile station apparatus 4. In operation EB, the compiling and distributing unit 31 acquires the location data from the location data storage unit 30. In operation EC, the compiling and distributing unit 31 transmits the location data through the CN simulating unit 28 to the mobile station apparatus 4. The CN simulating unit 28 executes packet communication protocol processing to send location data from the base station apparatus 2 to the mobile station apparatus 4 by using packet communication. Due to the CN simulating unit 28 executing packet communication protocol processing, the base station apparatus 2 becomes able to send data to the mobile station apparatus 4. The application processing unit 72 in the mobile station apparatus 4 stores the location data received from the base station apparatus 2 in the location data storage unit 74. The signal format of the location data transmitted from the base station apparatus 2 to the mobile station apparatus 4 is the same as the format of the location data illustrated in FIG. 10.

Referring again to FIG. 21, a case will be considered in which the mobile station apparatus 4 travels after the above processing and is then attached to the communication system 1 through another base station apparatus 2. In operation ED, the application processing unit 72 in the mobile station apparatus 4 transmits the location data stored in the location data storage unit 74 to the CN node apparatus 3. The CN processing unit 50 in the CN node apparatus 3 receives the location data and stores the location data in the location data storage unit 51.

FIG. 22 illustrates an example of the signal format of location data transmitted from the mobile station apparatus 4 to the CN node apparatus 3. The signal format in FIG. 22 includes information elements "mobile station identifier" and "connected-to base station identifier" besides the information elements in the signal format in FIG. 10. The information element "mobile station identifier" includes the identifier of the mobile station apparatus 4 from which the location data was transmitted, and the information element "connected-to base station identifier" includes the identifier of the base station apparatus 2 to which the mobile station apparatus 4 was connected to when the location data was transmitted. The example in FIG. 22 indicates that the location data was transmitted from the mobile station apparatus 4, having identifier AAAA, that was connected to the base station apparatus 2, having identifier 0002.

Referring again to FIG. 21, a case is assumed in which connection between the base station apparatus 2 and the fixed communication network 5 has recovered after the above processing, as indicated by the arrow 111. In operation EE, the NIF 20 detects that the connection to the fixed communication network 5 has recovered and notifies the state determining unit 27 that the state of the connection with the fixed communication network 5 has changed. In operation EF, the state determining unit 27 outputs, to the wireless controller 21, a command to switch the connection destination from the CN simulating unit 28 to the CN processing unit 50 in the CN node apparatus 3. In operation EG, the wireless controller 21 switches the connection destination to the CN processing unit 50.

In operation EH, the state determining unit 27 outputs, to the compiling and distributing unit 31, a command to output location data stored in the location data storage unit 30 to the CN node apparatus 3. In operation EL the compiling and distributing unit 31 acquires the location data from the location data storage unit 30. In operation EJ, the compiling and distributing unit 31 transmits the location data to the CN node apparatus 3. The CN processing unit 50 in the CN node apparatus 3 receives the location data and stores the location data in the location data storage unit 51. The signal format of the location data transmitted from the base station apparatus 2 to the CN node apparatus 3 is the same as the format of the location data illustrated in FIG. 10.

Figure 23:
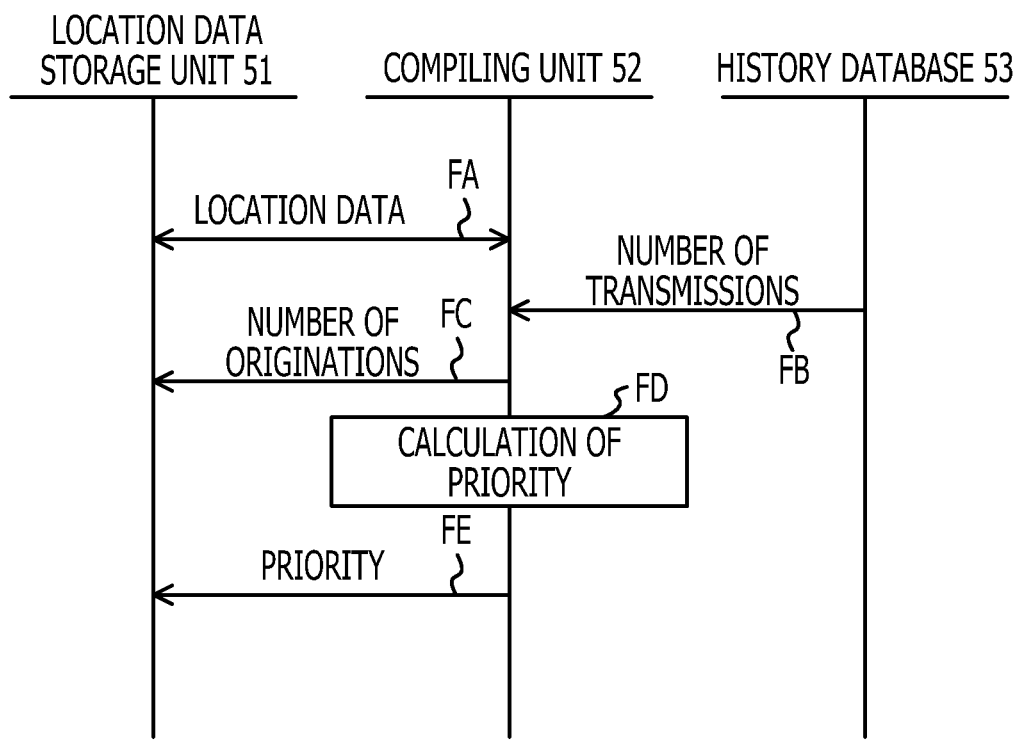
FIG. 23 illustrates an example of an operation sequence that the core network node follows.

5.4 Compilation of Location Data at the CN Node Apparatus 3 and Determination of a Search Priority Next, processing executed by the CN node apparatus 3 that has received location data will be described with reference FIG. 23. In operation FA, the compiling unit 52 compiles location data, which has been transmitted from each base station apparatus 2 and from each mobile station apparatus 4 and which has been stored in the location data storage unit 51, into location data for each mobile station apparatus 4. In this description, data compiled by the compiling unit 52 will be referred to as compiled data.

FIG. 24 illustrates an example of compiled data directly after compilation. The data format of the compiled data is the same as has been described with reference to FIG. 7. During the compilation of the location data, the compiling unit 52 acquires the value of the information element "CN simulation" in the compiled data from the information element "number of transmissions" in the location data. The compiling unit 52 also decides whether the mobile station apparatus 4 has traveled according to whether there is a match between the information element "source base station identifier" and "connected-to base station identifier" in the location data illustrated in FIG. 22, and determines the value of the information element "travel history" in the compiled data. At this point, information about the information element "CN" is not yet recorded.

In operation FB, the compiling unit 52 makes an inquiry to the history database 53 about the number of transmissions of voice calls and packet calls that were made by the mobile station apparatus 4, whose location data is included in the compiled data and were transmitted to the CN node apparatus 3. In operation FC, the compiling unit 52 adds the number of transmissions acquired from the history database 53 to the compiled data as the information element "CN". FIG. 25 illustrates an example of compiled data after the number of transmissions has been recorded. In the example in FIG. 25, the number of transmissions made by the mobile station apparatus 4 having identifier AAAA to the CN node apparatus 3 is recorded as 1 in the compiled data, and the number of transmissions made by the mobile station apparatus 4 having identifier ZZZZ to the CN node apparatus 3 is recorded as 0 in the compiled data.

Figure 26:
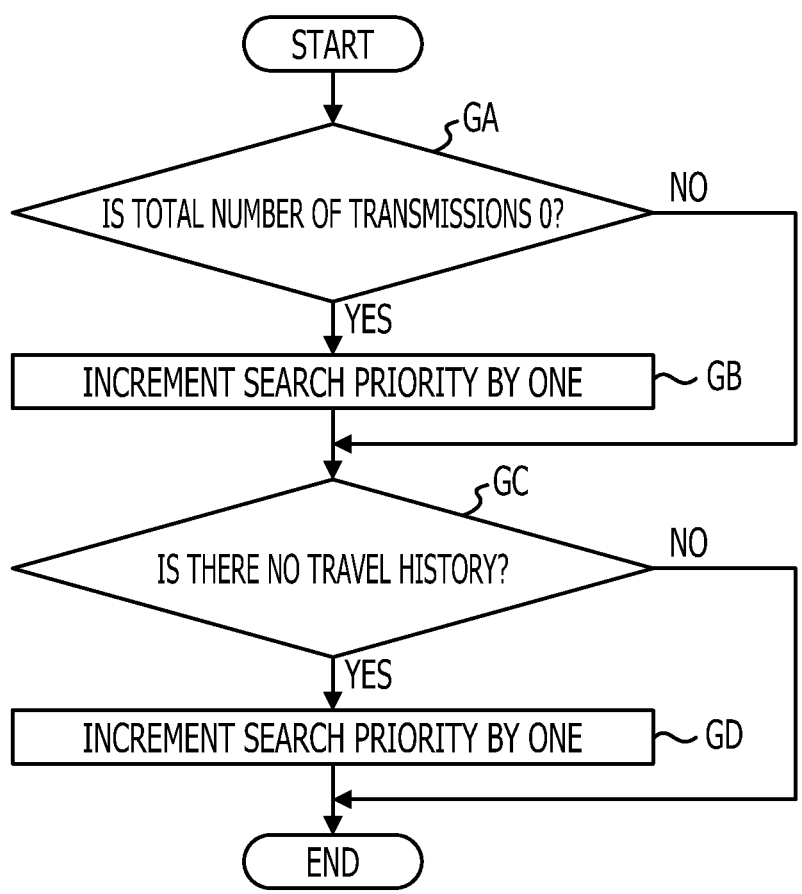
FIG. 26 illustrates an example of processing executed by a compiling unit to determine a search priority.

In operation FD, the compiling unit 52 determines a search priority at which the user of the mobile station apparatus 4 is searched for. FIG. 26 illustrates an example of a process executed by the compiling unit 52 to determine a search priority for each mobile station apparatus 4. In operation GA, the compiling unit 52 calculates the sum of the value of the information elements "CN simulation" and the value of "CN" in the compiled data as the number of transmissions from the mobile station apparatus 4 and determines whether the number of transmissions is 0.

If the number of transmissions is 0 (the result of operation GA is Y), the process proceeds to operation GB. If not (the result of operation GA is N), the process proceeds to operation GC. In operation GB, the compiling unit 52 increments the value of the search priority by one and causes the process to proceed to operation GC. A number of transmissions that is greater than zero demonstrates that the user is acting to make a call from a mobile telephone and it may be determined that the user is safe—conversely incrementing the priority is done for a mobile station apparatus for which the number of transmissions is 0 is.

In operation GC, the compiling unit 52 references the information element "travel history" in the compiled data and determines whether the mobile station apparatus 4 has traveled. If the mobile station apparatus 4 has no travel history (the result in operation GC is Y), the process proceeds to operation GD. If the mobile station apparatus 4 has traveled (the result in operation GC is N), the process finishes. In operation GD, the compiling unit 52 increments the value of the search priority by one and completes the process. If a mobile station apparatus 4 is traveling, it may be determined that the user is safe—conversely the priority is incremented for a mobile station apparatus 4 that has not traveled.

When the above processing has been executed for, for example, the mobile station apparatus 4 having identifier AAAA, the results in both operations GA and GC are N and thereby the search priority is 0, which is lowest. For the mobile station apparatus 4 having identifier ZZZZ, however, the results in both operations GA and GC are Y and thereby the search priority becomes 2, which is highest. The process to determine a search priority, illustrated in FIG. 26, has been described as an example; there is no intention to limit processing to determine a search priority to be assigned to the user only to the process illustrated in FIG. 26. A process to determine a search priority may be appropriately modified according to the usage purpose of the compiled data, the situation at that time, and various other factors.

Referring again to FIG. 23, in operation FE, the compiling unit 52 adds the determined search priority to the compiled data as the information element "search priority". The example of the compiled data at this point in time is the same as the compiled data illustrated in FIG. 7. The compiled data obtained from the compiling unit 52 may be used by, for example, organizations that perform rescue operations when a disaster occurs to determine whether users are affected by the disaster and to search for users. In another embodiment, the compiled data may be provided to persons related to users through bulletin-board web services used in times of disaster and other information providing systems.

6. Effects of this Embodiment

Even if the base station apparatus 2 is disconnected from the core network, this embodiment enables the base station apparatus 2 to collect location information for the mobile station apparatus 4. For example, even if the base station apparatus 2 is disconnected from the core network when a disaster occurs, the base station apparatus 2 may be used to collect location information useful for rescue operations concerning the user of the mobile station apparatus 4.

This embodiment enables the base station apparatus 2 to collect and save the location of the mobile station apparatus 4 directly after an external power supply stops supplying electric power to the base station apparatus 2. Accordingly, even if the external power supply stops supplying electric power to the base station apparatus 2, collection and saving of the location of the mobile station apparatus 4 may be executed while the base station apparatus 2 is being operated on the internal power supply. Even if the base station apparatus 2 may provide services by using the internal power supply only in a limited time, the base station apparatus 2 may be used to collect location information about the mobile station apparatus 4. Even if the power supply of the mobile station apparatus 4 is exhausted when the external power supply is restored and the connection between the core network and the base station apparatus 2 is restored, the location information for the mobile station apparatus 4 is saved in the base station apparatus 2, so the location information may be used.

This embodiment enables the base station apparatus 2 to distribute and store the collected location data in the mobile station apparatuses 4. Accordingly, even if the base station apparatus 2 is destroyed due to, for example, a fire or tsunami, the possibility that the collected location data becomes unable to be used may be reduced.

This embodiment enables the CN node apparatus 3 to compile location data transmitted from each base station apparatus 2 and location data transmitted from each mobile station apparatus 4 as data for each mobile station apparatus 4. Accordingly, even if duplicate location data is transmitted from the base station apparatus 2 and mobile station apparatus 4, duplicate location data is deleted. Accordingly, even if duplicate collected location data has been distributed and stored in the base station apparatus 2 and mobile station apparatuses 4, data compiled for each mobile station apparatus 4 may be provided.

This embodiment acquires a travel history and transmission history of a mobile station apparatus 4 and may thereby determine an urgency and a search priority.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
    a base station apparatus;
    a core network node apparatus; and
    a mobile station apparatus, wherein
    the base station apparatus includes a receiver, a transmitter, and a processor,
    the receiver is configured to receive a notification indicating a disaster from the core network node apparatus,
    the processor is configured to control the transmitter to transmit true area information to the mobile station apparatus when disaster information indicated by the notification does not meet a certain condition, and to control the transmitter to transmit false area information to the mobile station apparatus when the disaster information meets the certain condition,
    the processor is configured to control the transmitter to transmit a request requesting location information of the mobile station apparatus to the mobile station apparatus, to control the transmitter to increase power for transmitting of the request, to determine transmission timing of the request so as not to overlap another request transmitted from another base station, and to control the transmitter to transmit the request during the transmission timing,
    the processor is configured to acquire, from the mobile station apparatus, the location information indicating a location in which the mobile station apparatus is located when the disaster information meets the certain condition, and
    the transmitter is configured to transmit the location information to the core network node apparatus.

2. The wireless communication system according to claim 1, wherein the processor is configured to simulate at least part of the core network node apparatus.

3. The wireless communication system according to claim 2, wherein the core network node apparatus is configured to determine a priority degree of searching for the mobile station apparatus based on the location information of the mobile station apparatus.

4. The wireless communication system according to claim 3, wherein the processor is configured to detect recovery of a connection between the base station apparatus and the core network node apparatus after receiving the location information from the mobile station apparatus.

5. A base station apparatus communicating between a core network node and a mobile station apparatus, the base station apparatus comprising:
    a receiver configured to receive a notification indicating a disaster from the core network node;
    a processor; and
    a transmitter configured to transmit the location information to the core network node,
    wherein the processor is configured to control the transmitter to transmit true area information to the mobile station apparatus when disaster information indicated by the notification does not meet a certain condition, and to control the transmitter to transmit false area information to the mobile station apparatus when the disaster information meets the certain condition,
    the processor is configured to control the transmitter to transmit a request requesting location information of the mobile station apparatus to the mobile station apparatus, to control the transmitter to increase power for transmitting of the request, to determine transmission timing of the request so as not to overlap another request transmitted from another base station, and to control the transmitter to transmit the request during the transmission timing, and
    wherein the processor is configured to acquire, from the mobile station apparatus, the location information indicating a location in which the mobile station apparatus is located when the disaster information meets the certain condition.

6. The base station apparatus according to claim 5, wherein the processor is configured to simulate at least part of the core network node.

7. The base station apparatus according to claim 6, wherein the core network node apparatus is configured to determine a priority degree of searching for the mobile station apparatus based on the location information of the mobile station apparatus.

8. The base station apparatus according to claim 7, wherein the processor is configured to detect recovery of a connection between the base station apparatus and the core network node after receiving the location information from the mobile station apparatus.

9. A method using a wireless communication system including a base station apparatus, core network node apparatus, and a mobile station apparatus, the method comprising:
receiving, by the base station apparatus, a notification indicating a disaster from the core network node apparatus;
transmitting true area information to the mobile station apparatus when disaster information indicated by the notification does not meet a certain condition, and transmitting false area information to the mobile station apparatus when the disaster information meets the certain condition;
transmitting a request requesting location information of the mobile station apparatus to the mobile station apparatus;
increasing power for transmitting of the request;
determining transmission timing of the request so as not to overlap another request transmitted from another base station;
transmitting the request during the transmission timing;
acquiring, by the base station apparatus from the mobile station apparatus, the location information indicating a location in which the mobile station apparatus is located when the disaster information meets the certain condition; and
transmitting, by the base station apparatus, the location information to the core network node apparatus.

10. The method according to claim 9, further comprising:
simulating, by the base station apparatus, at least part of the core network node apparatus.

11. The method according to claim 10, further comprising:
determining, by the core network node apparatus, a priority degree of searching for the mobile station apparatus based on the location information of the mobile station apparatus.

12. The method according to claim 11, further comprising:
detecting, by the base station apparatus, recovery of connection between the base station apparatus and the core network node apparatus after receiving the location information from the mobile station apparatus.

13. The wireless communication system according to claim 4, wherein
the transmitter transmits the location information to the core network node apparatus after detecting the recovery of connection between the base station apparatus and the core network node apparatus.

14. The base station apparatus according to claim 8, wherein
the transmitter transmits the location information to the core network node apparatus after detecting the recovery of connection between the base station apparatus and the core network node apparatus.

15. The method according to claim 12, wherein
the transmitter transmits the location information to the core network node apparatus after detecting the recovery of connection between the base station apparatus and the core network node apparatus.

* * * * *